(12) United States Patent
Ogino

(10) Patent No.: US 6,294,276 B1
(45) Date of Patent: Sep. 25, 2001

(54) HYDROGEN MANUFACTURING AND SUPPLYING APPARATUS AND ELECTRIC MOTORCAR

(75) Inventor: Shigeru Ogino, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/284,974
(22) PCT Filed: Nov. 6, 1997
(86) PCT No.: PCT/JP97/04055
§ 371 Date: May 7, 1999
§ 102(e) Date: May 7, 1999
(87) PCT Pub. No.: WO98/19960
PCT Pub. Date: May 14, 1998

(30) Foreign Application Priority Data

Nov. 7, 1996 (JP) ................................................ 8-312999

(51) Int. Cl.⁷ .............................. H01M 8/04; H01M 8/18; C01B 3/00; C01B 3/02
(52) U.S. Cl. ................................ 429/17; 429/19; 429/20; 420/900
(58) Field of Search .......................... 429/17–20; 420/900

(56) References Cited

U.S. PATENT DOCUMENTS

| | | | |
|---|---|---|---|
| 4,200,682 | * | 4/1980 | Sederquist ............................ 429/17 |
| 5,527,632 | * | 6/1996 | Gardner ................................ 429/19 |
| 5,686,196 | * | 11/1997 | Singh et al. .......................... 429/17 |
| 5,780,179 | * | 7/1998 | Okamoto .............................. 429/20 |

FOREIGN PATENT DOCUMENTS

| | | |
|---|---|---|
| 62-105901 A | 5/1987 | (JP) . |
| 63-70669 U | 5/1988 | (JP) . |
| 2-174503 A | 7/1990 | (JP) . |
| 2-307801 A | 12/1990 | (JP) . |
| 3-217227 A | 9/1991 | (JP) . |
| 3-226203 A1 | 10/1991 | (JP) . |
| 4-163860 A | 6/1992 | (JP) . |
| 7-237902 A | 9/1995 | (JP) . |
| 7-286794 A | 10/1995 | (JP) . |
| 8-130805 A | 5/1996 | (JP) . |

* cited by examiner

Primary Examiner—Mark F. Huff
Assistant Examiner—Daborah Chacko-Davis
(74) Attorney, Agent, or Firm—Oblon, Spivak, McClelland, Maier & Neustadt, P.C.

(57) ABSTRACT

An electric vehicle with fuel cells which use hydrogen as a gaseous fuel. A hydrogen generator supplier feeds a supply of hydrogen to the electric vehicle and is mounted thereon. The hydrogen generator supplier utilizes city gas as a crude fuel to produce hydrogen. The hydrogen generator supplier is connected with piping which is part of the supply of commercial gas. The hydrogen generator supplier reforms a crude fuel to produce a hydrogen rich gas and subsequently separates the gaseous fuel from the hydrogen rich gas. The hydrogen generator supplier is connected to the electric vehicle by way of a specific connector which enables the gaseous hydrogen produced from the commercial gas to be supplied to the vehicle. Thus, the supply of hydrogen to be used as fuel in the electric vehicle is provided without having a new distribution for hydrogen.

13 Claims, 19 Drawing Sheets

HYDROGEN MANUFACTURING AND SUPPLYING APPARATUS AND ELECTRIC MOTORCAR

BACKGROUND OF THE INVENTION

1. Field of the Invention

The present invention relates to a hydrogen generator supplier and an electric vehicle. More specifically the invention pertains to a hydrogen generator supplier that reforms a crude fuel to generate a hydrogen rich gas, enhances the purity of the hydrogen rich gas to produce hydrogen, and feeds a supply of hydrogen thus produced to an electric vehicle. The invention also pertains to an electric vehicle that receives the supply of hydrogen fed from the hydrogen generator supplier and carries out power generation with fuel cells using the supply of hydrogen as a gaseous fuel, so as to obtain a driving force of the vehicle.

2. Discussion of the Background

A variety of electric vehicles have been known, which are provided with fuel cells as a power source for obtaining the driving force of the vehicle and are loaded with hydrogen as a gaseous fuel to carry out the power generation with the fuel cells or a crude fuel for generating the hydrogen. Hydrogen is mounted on the electric vehicle, for example, by charging hydrogen as a compressed gas in a tank or by making hydrogen absorbed into a hydrogen storage alloy. Since the hydrogen of an extremely high purity is fed as the gaseous fuel to the electrodes in the fuel cells, the electric vehicle with hydrogen mounted thereon has a favorably high efficiency of power generation in the operation of the fuel cells. This allows reduction in size of the fuel cells. The use of hydrogen having an extremely high purity effectively prevents toxic substances from being produced in the course of the variety of reactions proceeding in the electric vehicle. The drive of the electric vehicle thus effects the environmental protection.

A known electric vehicle with the crude fuel for producing hydrogen mounted thereon uses a hydrocarbon, such as methanol, as the crude fuel and includes a reformer that carries out the reforming reactions for reforming the crude fuel and producing a hydrogen rich gas (for example, JAPANESE PATENT LAID-OPEN GAZETTE No. 2-174503). Especially in the case where a liquid fuel, such as methanol, is used for the crude fuel, the electric vehicle with the crude fuel and the reformer mounted thereon advantageously extends the possible driving distance of the electric vehicle by one supply of fuel, compared with the case in which a gaseous fuel is used for the crude fuel. The crude material like hydrocarbons is more easily handled and safer for transport than the gaseous hydrogen.

A major problem of the electric vehicle with hydrogen mounted thereon as the fuel is the difficulty in widely distributing and increasing the availability of hydrogen that is stored in the gaseous form in a tank or absorbed in the hydrogen storage alloy. This is the bottleneck for spreading the electric vehicle with fuel cells that use hydrogen as the fuel. It is especially difficult to handle the gaseous hydrogen. There are lots of problems to be solved to enable a large mass of gaseous hydrogen to be readily transported and stored. The use of the hydrogen storage alloy for the transport and storage of hydrogen facilitates the handling, but the known hydrogen storage alloys are all rare metals and extremely expensive. The method of using the hydrogen storage alloy for transport and storage of hydrogen is thus not practical. When any method is applied for transport and storage of hydrogen, it is required to newly found a stable distribution system of hydrogen, in order to enable a supply of hydrogen to be directly fed as the fuel to the electric vehicle.

In the case where a hydrocarbon, such as methanol, is mounted as the crude fuel on the electric vehicle, trace amounts of toxic substances like carbon monoxide and nitrogen oxides occur in the process of reforming the crude fuel. Especially carbon monoxide not only causes the environmental pollution but adheres to the catalyst included in the fuel cells to inhibit the cell reactions. In the electric vehicle that runs while reforming the crude fuel in the reformer, it is required to regulate the operating conditions of the fuel cells and the reformer according to the magnitude of loading (the driving state) and vary the quantity of fuel supplied to the fuel cells and the quantity of power generation in the fuel cells. This undesirably complicates the control procedure. The structure of regulating the operating conditions of the reformer according to the magnitude of loading may not cause the reforming reactions to proceed at the optimum efficiency in the reformer. This results in wasting the energy. A specific amount of carbon dioxide is produced in the course of the reforming reactions of the crude fuel. In the case where a hydrogen rich gas containing the specific amount of carbon dioxide is used as the gaseous fuel, the efficiency of the electrochemical reactions in the fuel cells may be undesirably lowered, compared with the case in which hydrogen of a high purity is used as the gaseous fuel.

SUMMARY OF THE INVENTION

The object of the present invention is thus to provide a hydrogen generator supplier and an electric vehicle that enable hydrogen, which does not damage the environment, to be readily handled and mounted as a fuel on the electric vehicle without newly founding a special distribution system for the fuel.

The present invention provides a hydrogen generator supplier that feeds a supply of hydrogen to an electric vehicle, where the electric vehicle has a fuel storage unit, which enables storage of gaseous hydrogen, and fuel cells, which use the stored gaseous hydrogen as a gaseous fuel, mounted thereon. The hydrogen generator supplier includes: a reformer that reforms a crude fuel to produce a hydrogen rich gas; a hydrogen purifier that separates gaseous hydrogen from the hydrogen rich gas produced by the reformer; and a hydrogen supply unit that feeds the gaseous hydrogen separated by the hydrogen purifier to the fuel storage unit.

The hydrogen generator supplier of the present invention constructed as discussed above reforms a crude fuel to produce a hydrogenrich gas, separates gaseous hydrogen from the hydrogen rich gas, and supplies the gaseous hydrogen to the fuel storage unit, which enables storage of gaseous hydrogen and is mounted on the electric vehicle together with the fuel cells using hydrogen as the gaseous fuel.

The hydrogen generator supplier of the present invention enables a supply of hydrogen to be fed to the electric vehicle with the fuel cells using hydrogen as the gaseous fuel, without founding a new distribution system for hydrogen. The hydrogen generator supplier may be installed at an arbitrary position where the crude fuel is available for production of hydrogen and enables the hydrogen thus produced to be fed to the electric vehicle. The hydrogen generator supplier of the present invention can utilize hydrogen of a high purity for the gaseous fuel fed to the fuel cells mounted on the electric vehicle. The hydrogen rich gas obtained by reforming the crude fuel contains a certain quantity of carbon dioxide. Compared with the structure that utilizes the hydrogen rich gas for the gaseous fuel, the structure of using hydrogen of a high purity as the gaseous fuel favorably improves the efficiency of the electrochemical reactions proceeding in the fuel cells and thereby attains the higher energy efficiency.

In accordance with one preferable application of the present invention, the fuel storage unit includes a hydrogen storage alloy, in which hydrogen is absorbed and thereby stored. In this application, the hydrogen generator supplier further includes a fluid discharge unit that takes a predetermined fluid, which is heated with heat evolved in the fuel storage unit in the course of absorption of hydrogen into the hydrogen storage alloy, out of the electric vehicle when the gaseous hydrogen is fed to the fuel storage unit by the hydrogen supply unit.

In this application, the hydrogen fed from the hydrogen generator supplier to the fuel storage unit mounted on the electric vehicle is absorbed and thereby stored in the hydrogen storage alloy included in the fuel storage unit. The temperature of the predetermined fluid is increased with the heat evolved in the course of the absorption of hydrogen into the hydrogen storage alloy. The predetermined hot fluid is taken out of the electric vehicle via the fluid discharge unit included in the hydrogen generator supplier. This arrangement enables the heat produced in the fuel storage unit in the process of the supply of hydrogen to the electric vehicle to be taken out of the electric vehicle and the hydrogen generator supplier and utilized.

It is preferable that the reformer utilizes heat obtained from the fluid taken out by the fluid discharge unit for a reforming reaction of the crude fuel.

This structure enables the heat produced in the fuel storage unit in the process of the supply of hydrogen to the electric vehicle to be utilized for the reforming reactions of the crude fuel proceeding in the reformer. One possible method of utilizing the heat for the reforming reactions uses water as the fluid, adds the water heated with the heat produced in the fuel storage unit to the crude fuel, and causes the mixture of hot water and the crude fuel to be subjected to the reforming reactions. This structure desirably prevents the heat produced in the fuel storage unit from being wasted and reduces the heat required for evaporating and heating the crude fuel mixed with water, prior to the reforming reactions.

In accordance with another preferable application of the present invention, the hydrogen generator supplier further includes: a hydrogen storage unit that stores the gaseous hydrogen separated by the hydrogen purifier; a hydrogen load detection unit that measures a quantity of the gaseous hydrogen stored in the hydrogen storage unit; and a hydrogen load regulation unit that controls operations of the reformer and the hydrogen purifier based on the quantity of hydrogen observed by the hydrogen load detection unit and regulates the quantity of hydrogen stored in the hydrogen storage unit to a predetermined level.

The hydrogen generator supplier of this application measures the quantity of hydrogen, which is currently present in the hydrogen storage unit, in the process of producing hydrogen and storing hydrogen in the hydrogen storage unit. The structure controls the operations of the reformer and the hydrogen purifier according to the observed quantity of hydrogen, in order to regulate the quantity of hydrogen stored in the hydrogen storage unit to a predetermined level. This arrangement enables a specific quantity of hydrogen to be produced and stored in advance and thereby enables a required quantity of hydrogen to be quickly fed to the electric vehicle.

In accordance with still another preferable application of the present invention, the hydrogen generator supplier further includes: a remaining hydrogen quantity input unit that inputs information relating to a remaining quantity of hydrogen in the fuel storage unit mounted on the electric vehicle; and a hydrogen supply regulation unit that controls operations of the reformer and the hydrogen purifier based on the information relating to the remaining quantity of hydrogen input by the remaining hydrogen quantity input unit, in order to produce a predetermined quantity of hydrogen, and supplies the predetermined quantity of hydrogen to the fuel storage unit via the hydrogen supply unit.

The hydrogen generator supplier of this application inputs information, which relates to the remaining quantity of hydrogen in the fuel storage unit mounted on the electric vehicle, in the process of the supply of hydrogen to the electric vehicle. The structure controls the operations of the reformer and the hydrogen purifier, based on the information relating to the remaining quantity of hydrogen input by the remaining hydrogen quantity input unit, so as to enable a predetermined quantity of hydrogen to be produced and supplied to the fuel storage unit via the hydrogen supply unit. Connecting the hydrogen generator supplier with the electric vehicle via a predetermined joint and starting the operation of the hydrogen generator supplier enables a required quantity of hydrogen to be produced and completes the storage of hydrogen in the fuel storage unit mounted on the electric vehicle.

It is also preferable that a commercial gas including a hydrocarbon as a primary component is used for the crude fuel, and the hydrogen generator supplier further includes a joint unit that connects with a piping of the commercial gas to enable a feed of the crude fuel.

This application uses the commercial gas, which includes a hydrocarbon as the primary component, for the crude fuel to produce hydrogen. This makes the crude fuel readily available, for example, at home. The hydrogen generator supplier of the present invention may thus be set at an arbitrary position where the piping of the commercial gas is laid, so as to produce hydrogen and feed the supply of hydrogen to the electric vehicle.

The present invention is also directed to a connector that connects a hydrogen supplier for feeding a supply of hydrogen with an electric vehicle, where the electric vehicle has a fuel storage unit, which stores gaseous hydrogen, and fuel cells, which use the stored gaseous hydrogen as a gaseous fuel, mounted thereon. The connector includes: a first connection unit that connects the electric vehicle with the hydrogen supplier via a hydrogen supply path, through which hydrogen is fed from the hydrogen supplier to the fuel storage unit; and a second connection unit that connects the electric vehicle with the hydrogen supplier via a signal line, which transmits information relating to a remaining quantity of hydrogen in the fuel storage unit to the hydrogen supplier.

The connector of the present invention constructed as discussed above is used to connect the fuel storage unit, in which hydrogen is stored, with the hydrogen supplier, which feeds a supply of hydrogen to the electric vehicle with the fuel cells using the stored hydrogen as the gaseous fuel. Joining the fuel storage unit with the hydrogen supplier via the connector connects the hydrogen supply path for feeding the supply of hydrogen from the hydrogen supplier to the fuel storage unit, as well as the signal line for transmitting the information relating to the remaining quantity of hydrogen in the fuel storage unit to the hydrogen supplier, between the electric vehicle and the hydrogen supplier. The connector may be attached to either one of the hydrogen supplier and the electric vehicle or alternatively both of them.

Simply joining this connector to a predetermined joint of the electric vehicle effects the simultaneous connections of the hydrogen supply path and the signal line, thereby improving the operatability in the process of the supply of hydrogen to the electric vehicle.

In the case where a specific fluid other than hydrogen is transmitted between the hydrogen supplier and the electric vehicle, it is preferable that a fluid flow path, through which the specific fluid flows, is connected simultaneously with the hydrogen supply path and the signal line. This arrangement enables the flow path of any fluid other than hydrogen to be connected between the electric vehicle and the hydrogen supplier simply by joining the electric vehicle with the hydrogen supplier via the connector.

The present invention is directed to a first electric vehicle with fuel cells, which use hydrogen as a gaseous fuel, mounted thereon, wherein electric power obtained from the fuel cells is utilized for a driving force of the electric vehicle. The first electric vehicle includes: a fuel storage unit that includes a hydrogen storage alloy, in which hydrogen is absorbed and thereby stored as the gaseous fuel; a fluid heating unit that heats a predetermined fluid with heat evolved in the fuel storage unit in the course of absorption of hydrogen into the hydrogen storage alloy when a supply of hydrogen is fed to the fuel storage unit; and a heat release unit that leads the fluid heated by the fluid heating unit to outside of the electric vehicle.

The first electric vehicle of the present invention constructed as discussed above uses hydrogen as the gaseous fuel when receiving the electric power from the fuel cells to obtain the driving force of the vehicle. The storage of hydrogen is implemented by making hydrogen absorbed into the hydrogen storage alloy included in the fuel storage unit. In the course of the storage of hydrogen, the predetermined fluid is heated with the heat produced in the course of the absorption of hydrogen into the hydrogen storage alloy and led to the outside of the electric vehicle. The electric vehicle of this application enables the heat produced in the course of the absorption of hydrogen into the hydrogen storage alloy to be utilized outside the electric vehicle.

The present invention is also directed to a second electric vehicle with fuel cells, which use hydrogen as a gaseous fuel, mounted thereon, wherein electric power obtained from the fuel cells is utilized for a driving force of the electric vehicle. The second electric vehicle includes: a fuel storage unit that stores hydrogen as the gaseous fuel; a remaining hydrogen quantity detection unit that measures a remaining quantity of hydrogen in the fuel storage unit; and a remaining hydrogen quantity transmission unit that transmits information relating to the remaining quantity of hydrogen observed by the remaining hydrogen quantity detection unit to a preset hydrogen supplier, which feeds a supply of hydrogen to the fuel storage unit.

The second electric vehicle of the present invention constructed as discussed above uses hydrogen as the gaseous fuel when receiving the electric power from the fuel cells to obtain the driving force of the vehicle. In the process of the storage of hydrogen into the fuel storage unit mounted on the electric vehicle, the electric vehicle measures the remaining quantity of hydrogen in the fuel storage unit and transmits the information relating to the observed remaining quantity of hydrogen to the preset hydrogen supplier, which feeds the supply of hydrogen to the fuel storage unit.

The electric vehicle of this structure enables a specific quantity of hydrogen corresponding to the remaining quantity of hydrogen in the fuel storage unit to be fed from the preset hydrogen supplier to the fuel storage unit. This arrangement does not require the user to monitor the supply of hydrogen to the fuel storage unit, but allows the automatic operation of the hydrogen supplier, in order to store a sufficient quantity of hydrogen in the fuel storage unit.

Another aspect of the present invention is a method of producing hydrogen and feeding a supply of hydrogen to an electric vehicle, where the electric vehicle has a fuel storage unit that stores the hydrogen as a gaseous fuel. The method includes the steps of: reforming a crude fuel, which is a commercial gas including a hydrocarbon as a primary component, and thereby producing a hydrogen rich gas; separating gaseous hydrogen from the hydrogen rich gas; and feeding the gaseous hydrogen to the fuel storage unit.

The method of the present invention enables a supply of hydrogen to be fed to the electric vehicle with the fuel cells using hydrogen as the gaseous fuel, without founding a new distribution system for hydrogen. This method enables hydrogen to be produced at an arbitrary position where the crude fuel is available and allows the hydrogen thus produced to be fed to the electric vehicle. The method of the present invention can utilize hydrogen of a high purity for the gaseous fuel fed to the fuel cells mounted on the electric vehicle. The hydrogen rich gas obtained by reforming the crude fuel contains a certain quantity of carbon dioxide. Compared with the case in which the hydrogen rich gas is used for the gaseous fuel, the arrangement of using hydrogen of a high purity as the gaseous fuel favorably improves the efficiency of the electrochemical reactions proceeding in the fuel cells and thereby attains the higher energy efficiency.

Still another aspect of the present invention is an electric vehicle system including an electric vehicle and a hydrogen generator supplier, where the electric vehicle has fuel cells, which use hydrogen as a gaseous fuel, mounted thereon and utilizes electric power obtained from the fuel cells for a driving force of the electric vehicle. The hydrogen generator supplier reforms a crude fuel to produce gaseous hydrogen and feeds the gaseous hydrogen as the gaseous fuel to the electric vehicle. The electric vehicle includes: a fuel storage unit that includes a hydrogen storage alloy, in which hydrogen is absorbed and thereby stored as the gaseous fuel; and a heat discharge unit that discharges heat, which is evolved in the fuel storage unit in the course of absorption of hydrogen into the hydrogen storage alloy when a supply of hydrogen is fed to the fuel storage unit, to outside of the electric vehicle via a specific fluid. The hydrogen generator supplier includes: a reformer that reforms the crude fuel by taking advantage of the heat discharged via the specific fluid by the heat discharge unit of the electric vehicle when a supply of hydrogen is fed from the hydrogen generator supplier to the electric vehicle.

This arrangement enables the heat produced in the course of the absorption of hydrogen into the hydrogen storage alloy included in the fuel storage unit mounted on the electric vehicle to be used for the reforming reactions of the crude fuel in the hydrogen generator supplier. This favorably reduces the energy required for the reforming reactions.

OTHER APPLICATION OF THE INVENTION

The present invention may be actualized by other applications given below. In accordance with a first possible application, the hydrogen generator supplier of the present invention further includes: a water flow path that receives a supply of water, which is fed from outside; a fluid flow path that receives a supply of a predetermined fluid, which is heated by a specific high temperature unit in the hydrogen generator supplier; a heat exchange unit that carries out heat exchange between the water flowing through the water flow path and the predetermined hot fluid flowing through the fluid flow path; and a heat application unit that takes the water, which is heated through the heat exchange with the predetermined fluid in the heat exchange unit and flows through the water flow path, out of the hydrogen generator supplier.

The hydrogen generator supplier of this application receives a supply of water fed from the outside. Heat exchange is carried out between the predetermined fluid heated by the specific high temperature unit in the hydrogen generator supplier and the water fed from the outside. The water heated through the heat exchange is taken out of the hydrogen generator supplier. This arrangement enables the heat produced in the hydrogen generator supplier to be utilized outside the hydrogen generator supplier. This application thus reduces the quantity of wastefully released heat (waste heat) among the heat produced in the hydrogen generator supplier and thereby ensures the effective use of the energy.

In accordance with a second possible application, a main body constituting the hydrogen generator supplier has a specific grip element on the outer surface thereof to facilitate the carriage of the hydrogen generator supplier. The hydrogen generator supplier further has an introduction unit that leads a supply of the crude fuel required for production of hydrogen into the hydrogen generator supplier. The introduction unit is freely attached to and detached from an external joint.

The hydrogen generator supplier of this application may be separated from the external joint, through which the supply of the crude fuel required for production of hydrogen is fed, by detaching the introduction unit from the external joint. This arrangement enables the hydrogen generator supplier to be readily carried with the predetermined grip element. The hydrogen generator supplier can thus be moved to an arbitrary position where the supply of the crude fuel required for production of hydrogen is available, in order to produce hydrogen and feed the hydrogen to the electric vehicle.

DETAILED DESCRIPTION OF THE PREFERRED EMBODIMENTS

Figure 1:
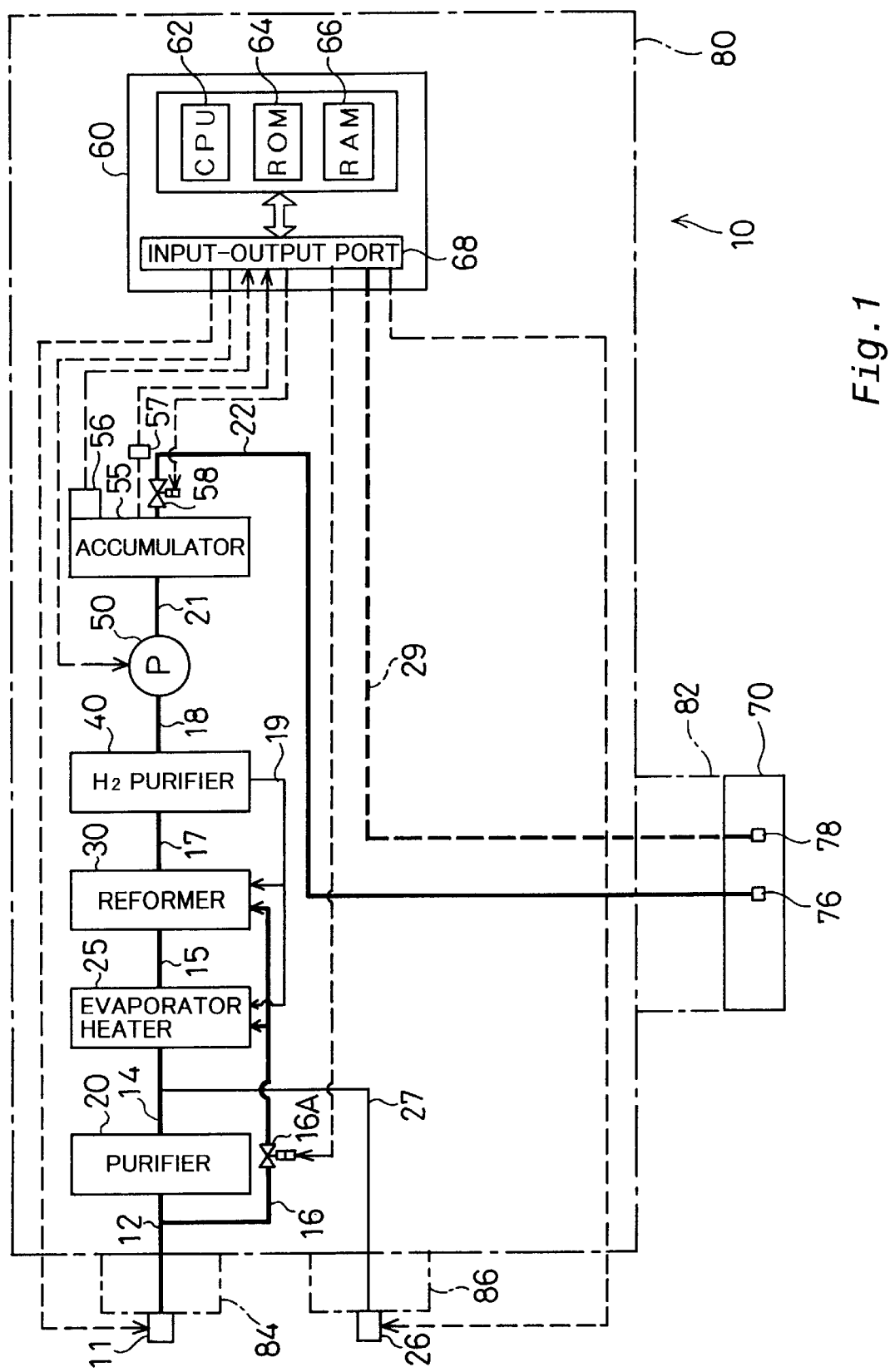
FIG. 1 is a block diagram illustrating the structure of a hydrogen generator supplier 10 in one preferred embodiment according to the present invention.
Figure 2:
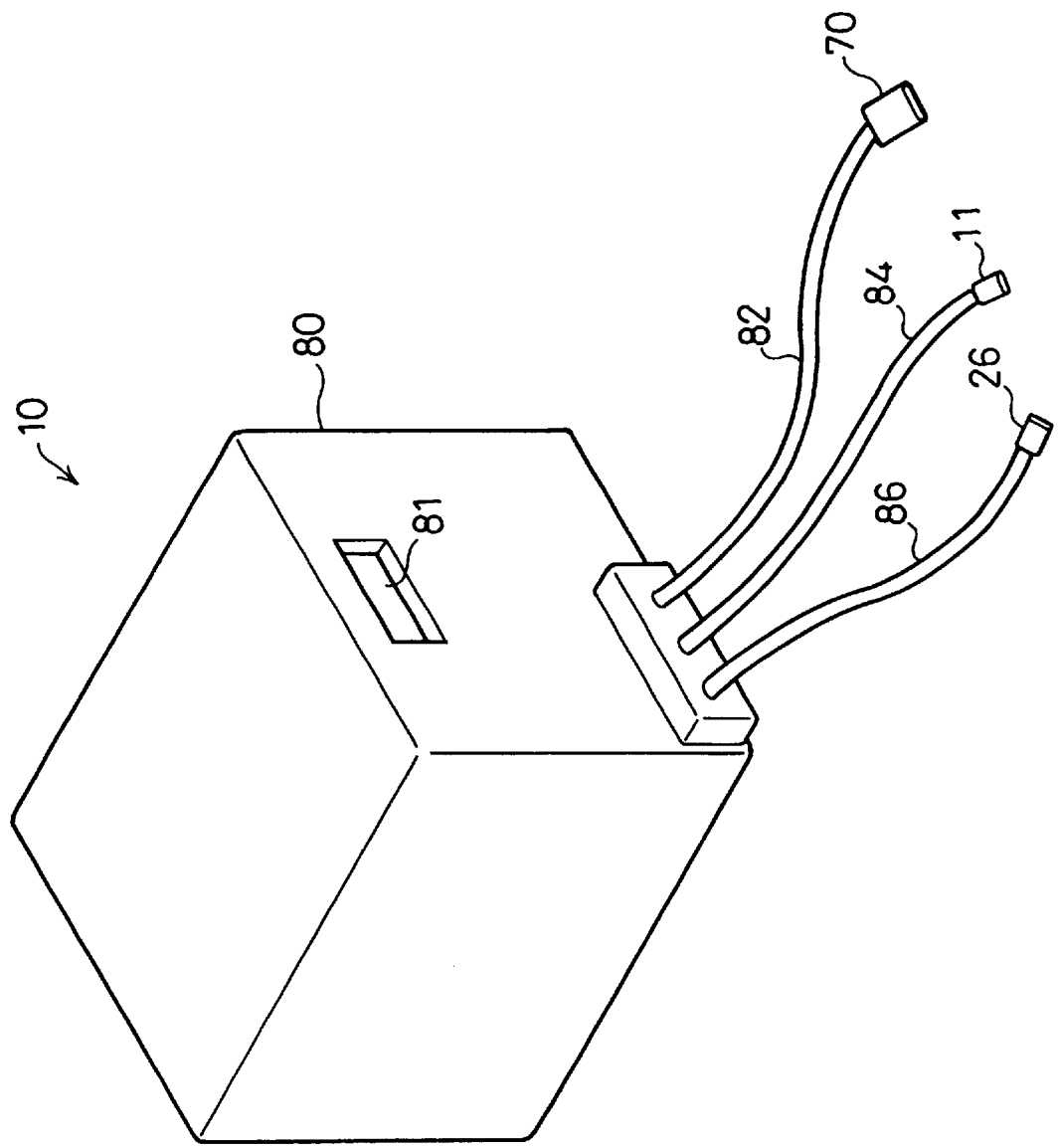
FIG. 2 is a perspective view schematically illustrating the appearance of the hydrogen generator supplier 10.
Figure 3:
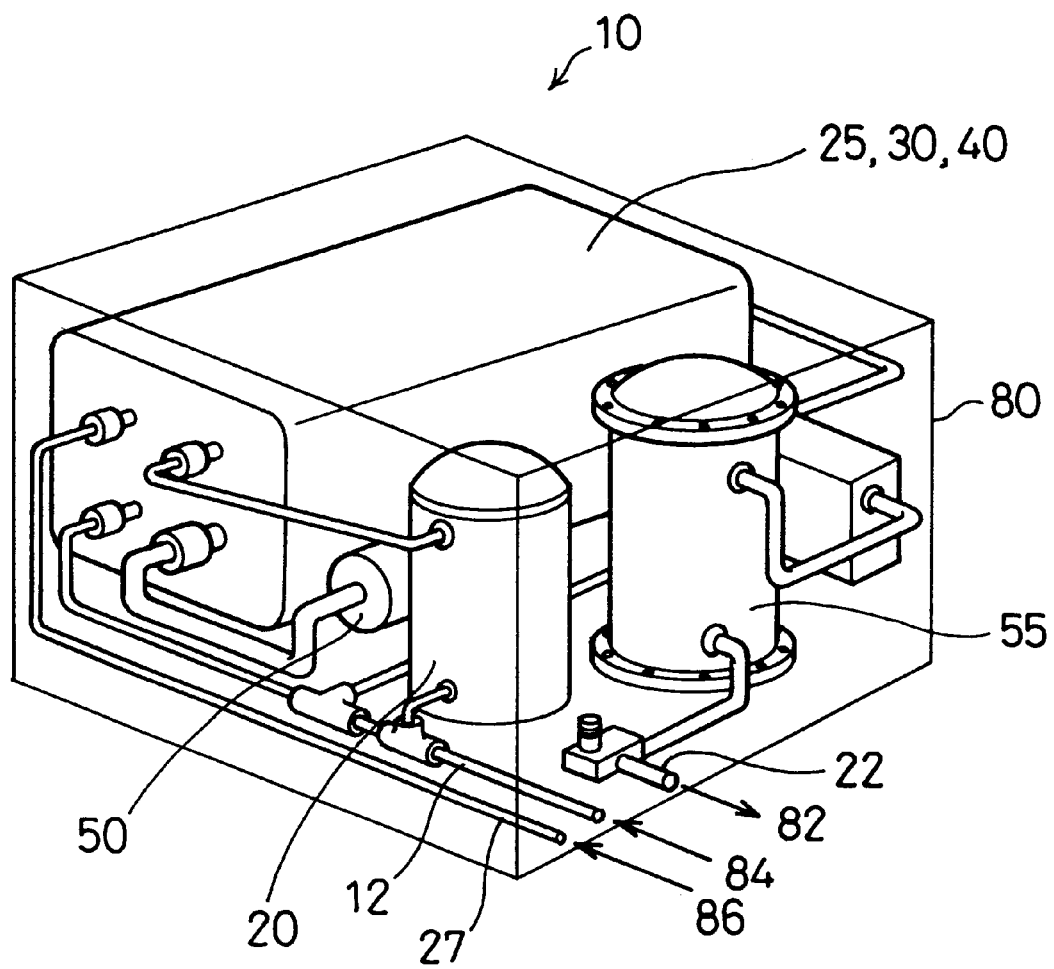
FIG. 3 schematically illustrates the internal structure of the hydrogen generator supplier 10.
Figure 4:
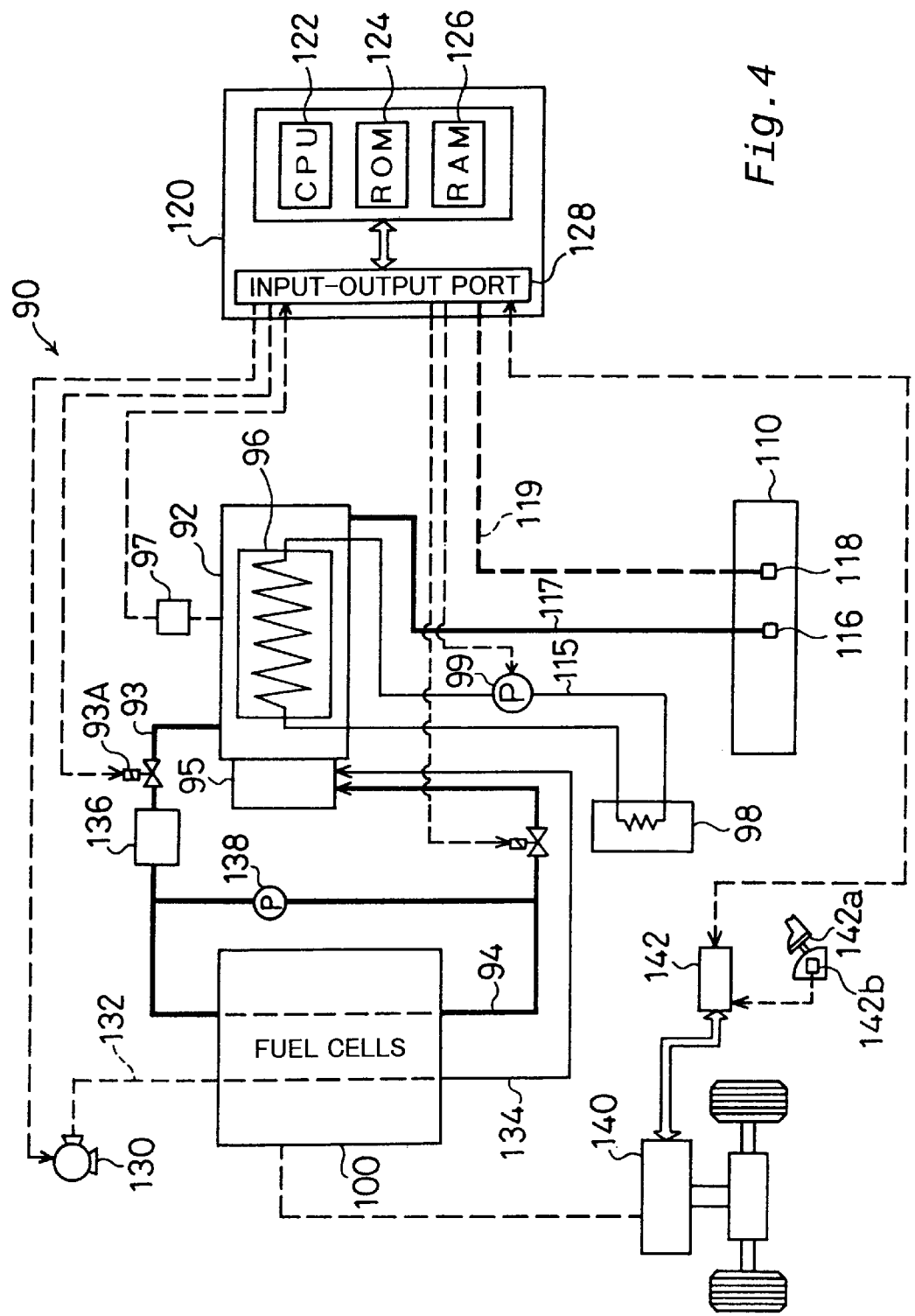
FIG. 4 is a block diagram illustrating the structure of an electric vehicle 90 which receives a supply of hydrogen fed from the hydrogen generator supplier 10.

Some modes of carrying out the present invention are discussed below as preferred embodiments, in order to further clarify the structures and the functions of the present invention described above. FIG. 1 is a block diagram illustrating the structure of a hydrogen generator supplier 10 in one preferred embodiment according to the present invention. FIG. 2 schematically illustrates the appearance of the hydrogen generator supplier 10. FIG. 3 schematically illustrates the internal structure of the hydrogen generator supplier 10. FIG. 4 is a block diagram illustrating the structure of an electric vehicle 90 which receives a supply of hydrogen fed from the hydrogen generator supplier 10.

The hydrogen generator supplier 10 includes a main body 80 with a structure for generating hydrogen incorporated therein and three tubes (a connection tube 82, a gas supply tube 84, and a water supply tube 86) extending from the main body 80 to outside. The hydrogen generator supplier 10 receives a supply of city gas and reforms the supply of city gas to produce hydrogen. The connection tube 82 has a connector 70 on a free end thereof and defines a hydrogen supply path 22 therein. The gas supply tube 84 has a gas inlet 11 on a free end thereof and defines a city gas supply conduit 12 therein. The water supply tube 86 has a water inlet 26 on a free end thereof and defines a water supply path 27 therein. The electric vehicle 90 includes a fuel tank 92, in which the supply of hydrogen fed from the hydrogen generator supplier 10 is stored, and a stack of fuel cells 100 that receive a supply of hydrogen fed from the fuel tank 92 and carry out power generation using the supply of hydrogen as a gaseous fuel. The electric power generated by the fuel cells 100 is used to drive a motor 140 mounted on the electric vehicle 90 and run the electric vehicle 90. The connector 70 is connectable with a connector-receptor 110 disposed at a predetermined position in the electric vehicle 90.

The hydrogen generator supplier 10 is described first with the drawings of FIGS. 1 through 3. The hydrogen generator supplier 10 includes the gas inlet 11, a purifier 20, an evaporator heater 25, a reformer 30, a hydrogen purifier 40, a compressor 50, an accumulator 55, a controller 60, the connector 70, and the water inlet 26 as primary constituents. The hydrogen generator supplier 10 receives a supply of city gas via the gas inlet 11, reforms the supply of city gas to produce a hydrogen rich gas, separates gaseous hydrogen from the hydrogen rich gas, and accumulates the gaseous hydrogen thus produced to a predetermined amount, so as to prepare for the supply of gaseous hydrogen to the electric vehicle 90. The following describes the respective constituents of the hydrogen generator supplier 10.

The gas inlet 11 is formed on the free end of the city gas supply conduit 12 that introduces a supply of city gas into the hydrogen generator supplier 10 of the present invention. The gas inlet 11 has a specific shape to be stably connectable with piping of the city gas (natural gas) leading to the respective houses. Connecting the gas inlet 11 with a specific structure formed on a free end of the piping of the city gas enables a required amount of the city gas to be supplied safely to the hydrogen generator supplier 10. The required amount of the city gas fed via the gas inlet 11 flows through the city gas supply conduit 12 and is introduced into the purifier 20. The city gas supply conduit 12 is a tubular structure that connects the gas inlet 11 with the purifier 20, and has its main portion inside the gas supply tube 84. The user connects the gas inlet 11 with the specific structure formed on the free end of the piping of the city gas and opens a certain valve disposed in the vicinity of the free end of the piping of the city gas. This ensures preparation for a supply of the city gas to the hydrogen generator supplier 10. The gas inlet 11 has a non-illustrated solenoid valve, and the ON/OFF state of the solenoid valve is controlled by the controller 60. When an instruction for a start is input through operation of a predetermined start switch disposed in the hydrogen generator supplier 10, the controller 60 sets the solenoid valve in the ON position and starts a supply of the city gas to the hydrogen generator supplier 10. When a required amount of hydrogen is produced, the controller 60 sets the solenoid valve in the OFF position and stops the supply of the city gas to the hydrogen generator supplier 10.

The purifier 20 removes a sulfur content, such as mercaptan, added to the city gas as an odorant. As mentioned previously, the supply of city gas is fed to the purifier 20 via the gas inlet 11 and the city gas supply conduit 12. The sulfur content lowers the activity of a catalyst included in the reformer 30 and inhibits the reforming reactions proceeding in the reformer 30. In the hydrogen generator supplier 10, the purifier 20 is accordingly arranged before the reformer 30 to remove the sulfur content. The purifier 20 removes the sulfur content from the supply of city gas fed via the gas inlet 11 and the city gas supply conduit 12, while the supply of city gas passes through the surface of a catalyst included in the purifier 20. The removal of the sulfur content gives a desulfurized gas, which is led to the evaporator heater 25 via a desulfurized gas supply conduit 14.

The evaporator heater 25 mixes the desulfurized gas after the removal of the sulfur content by the purifier 20 with vaporized water to yield a gaseous mixture and heats the gaseous mixture to specific temperatures suitable for the reforming reactions. The water supply path 27 is connected to the desulfurized gas supply conduit 14 to add a supply of water required or the reforming reactions to the desulfurized gas. The water supply path 27 is a flow path that connects the water inlet 26 with the desulfurized gas supply conduit 14. The water supply path 27 receives a supply of water from a predetermined water piping via the water inlet 26. The evaporator heater 25 has a non-illustrated heater unit, which raises the internal temperature of the evaporator heater 25 to a predetermined range of 600° C. through 800° C. The gaseous mixture of the desulfurized gas and the water vapor vaporized and heated in the evaporator heater 25 is fed to the reformer 30 via a gaseous mixture supply conduit 15 and subjected to the reforming reactions proceeding in the reformer 30.

The heater unit included in the evaporator heater 25 can receive a supply of fuel for heating via a city gas branch path 16, which diverges from the city gas supply conduit 12, and a reformed gas exhaust path 19, which comes from the hydrogen purifier 40. The heater unit included in the evaporator heater 25 combusts the city gas fed through the city gas branch path 16 and a reformed gas exhaust fed through the reformed gas exhaust path 19, in order to heat the inside of the evaporator heater 25 to the predetermined temperatures. The reformed gas exhaust fed through the reformed gas exhaust path 19 will be described in detail later.

The reformer 30 reforms the hot desulfurized gas fed from the evaporator heater 25 via the gaseous mixture supply conduit 15 and produces a hydrogen rich gas. The reforming reactions proceeding in the reformer 30 include the following reforming reactions with respect to methane, which is a main component of the city gas:

$$CH_4 + H_2O \rightarrow CO + 3H_2 \tag{1}$$

$$CO + H_2O \rightarrow CO_2 + H_2 \tag{2}$$

$$CH_4 + 2H_2O \rightarrow CO_2 + 4H_2 \tag{3}$$

The reforming reactions proceeding in the reformer 30 include a decomposing reaction of methane expressed as Formula (1) and a deforming reaction of carbon monoxide expressed as Formula (2), which proceed simultaneously. As a whole, the reaction of Formula (3) arises to produce a hydrogen rich gas containing carbon dioxide. The reaction of Formula (1) is endothermic, whereas the reaction of Formula (2) is exothermic. The total reaction of Formula (3) is endothermic. The reformer 30 includes a nonillustrated heater unit, which raises the internal temperature of the reformer 30 to a predetermined range of 600° C. through 800° C. As described previously, the gaseous mixture fed to the reformer 30 has been heated to the predetermined temperature range of 600° C. through 800° C. in advance. When the gaseous mixture is fed to the reformer 30, the reforming reactions proceed quickly. The reformer 30 is filled with alumina pellets with a reforming catalyst (for example, nickel or ruthenium catalyst) carried thereon. The gaseous mixture fed to the reformer 30 via the gaseous mixture supply conduit 15 comes into contact with the reforming catalyst, so that the reforming reactions expressed as Formulae (1) through (3) proceed on the surface of the reforming catalyst. Hydrogen and carbon dioxide are produced with a progress of the reforming reactions, and the hydrogen-rich reformed gas is fed to the hydrogen purifier 40 via a reformed gas supply conduit 17.

Like the heater unit included in the evaporator heater 25 discussed above, the heater unit included in the reformer 30 to raise the internal temperature of the reformer 30 to the predetermined range can receive a supply of fuel for heating via the city gas branch path 16, which diverges from the city gas supply conduit 12, and the reformed gas exhaust path 19, which comes from the hydrogen purifier 40. The heater unit included in the reformer 30 combusts the city gas fed through the city gas branch path 16 and the reformed gas exhaust fed through the reformed gas exhaust path 19, in order to heat the inside of the reformer 30 to the predetermined temperatures.

The city gas branch path 16, through which the city gas is supplied to the heater units respectively included in the reformer 30 and the evaporator heater 25, is provided with a solenoid valve 16A. Controlling the ON/OFF state of the solenoid valve 16A enables required amounts of the city gas to be fed to the heater units included in the reformer 30 and the evaporator heater 25. On a start of the hydrogen generator supplier 10 of the embodiment, the heater units use only the city gas fed through the city gas branch path 16 for heating. When a predetermined time elapses after the start of the hydrogen generator supplier 10 and a sufficient quantity of the reformed gas exhaust, which will be discussed later, starts to be discharged from the hydrogen purifier 40, the ON/OFF state of the solenoid valve 16A is regulated to change a major part of the fuel used for combustion in the heater units from the city gas to the reformed gas exhaust.

As described above, the reformer 30 and the purifier 20 are respectively filled with alumina pellets with the reforming catalyst and the desulfurizing catalyst carried thereon. In accordance with one possible modification, each of the reformer 30 and the purifier 20 may be composed of a honeycomb tube, where the corresponding catalyst adheres to the surface of the honeycomb tube. The dimensions of the reformer 30 and the purifier 20 as well as the quantities of the catalysts charged in the reformer 30 and the purifier 20 are set to ensure the progress of the reactions with a sufficient efficiency under the pressure of the city gas supplied to the hydrogen generator supplier 10.

Figure 5:
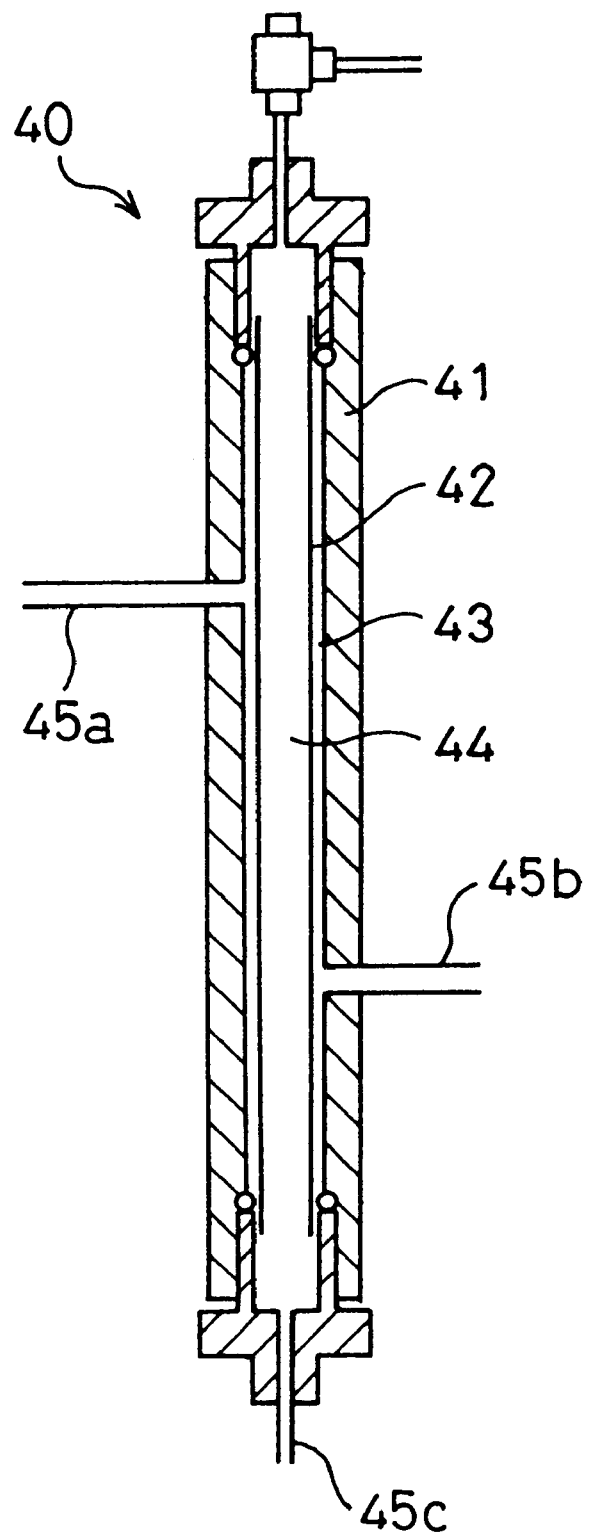
FIG. 5 is a sectional view illustrating the structure of a hydrogen purifier 40 of the embodiment.

The hydrogen purifier 40 separates hydrogen from the reformed gas produced by the reformer 30 and gives gaseous hydrogen of a high purity. FIG. 5 illustrates the structure of the hydrogen purifier 40 of the embodiment. The hydrogen purifier 40 includes a hydrogen separation film 42 disposed inside a casing 41. There is an outer space 43 formed between the casing 41 and the hydrogen separation film 42, whereas there is an inner space 44 formed inside the hydrogen separation film 42.

The hydrogen purifier 40 separates hydrogen by taking advantage of the characteristic that palladium or palladium alloy, which the hydrogen separation film 42 is composed of, enables selective permeation of hydrogen. The hydrogen separation film 42 includes a film base that is composed of porous ceramics, porous glass, or the like and is coated with palladium or palladium alloy. The film base gives the mechanical strength to the hydrogen separation film 42. The coat of palladium or palladium alloy is formed as a dense film without pinholes by any known method, for example, a combination of electrolytic plating and electroless plating.

The reformed gas is fed to the outer space 43 under a predetermined pressure via a line 45a connecting with the reformed gas supply conduit 17. Hydrogen included in the reformed gas fed to the outer space 43 selectively permeates the hydrogen separation film 42, passes through a porous layer of the film base, and moves to the inner space 44. The hydrogen permeating the hydrogen separation film 42 in this manner is discharged outside the hydrogen purifier 40 via a line 45c formed on one end of the inner space 44. The line 45c is connected with a hydrogen supply passageway 18, and hydrogen separated by the hydrogen purifier 40 is led to the compressor 50 via the hydrogen supply passageway 18. Here all the hydrogen doe not permeate the hydrogen separation film 42. The remaining hydrogen that has not permeated the hydrogen separation film 42 and the components other than hydrogen that can not permeate the hydrogen separation film 42 are discharged outside the hydrogen purifier 40 via a line 45b as the reformed gas exhaust. The arrangement of feeding the reformed gas to the hydrogen purifier 40 and causing the reformed gas to permeate the hydrogen separation film 42 enables approximately 70% of the hydrogen included in the reformed gas to be separated as pure gaseous hydrogen. The reformed gas exhaust discharged outside the hydrogen purifier 40 via the line 45b passes through the reformed gas exhaust path 19 and is fed to the heater units included in the evaporator heater 25 and the reformer 30 as the fuel for combustion.

In the hydrogen generator supplier 10 of the embodiment, the city gas and the reformed gas exhaust are fed to both the evaporator heater 25 and the reformer 30 and used as the fuel for combustion. In one modified structure, if the gaseous mixture is sufficiently heated in the evaporator heater 25 and the sufficiently hot gaseous mixture is fed to the reformer 30, the reformer 30 may not include the heater unit for heating the inside of the reformer 30. In this case, the city gas fed through the city gas branch path 16 and the reformed gas exhaust fed through the reformed gas exhaust path 19 are not supplied to the reformer 30 but are supplied only to the evaporator heater 25. In the reformer 30, the reforming reactions proceed only with the heat of the gaseous mixture fed to the reformer 30.

The hydrogen supply passageway 18, to which the gaseous hydrogen separated from the reformed gas by the hydrogen purifier 40 is discharged, is connected to the compressor 50. The gaseous hydrogen pressurized by the compressor 50 is fed to the accumulator 55 via a pressurized gas conduit 21. The compressor 50 applies a sufficient pressure to the gaseous hydrogen in order to enable the pressurized hydrogen to be stored in the accumulator 55, and leads the pressurized hydrogen to the accumulator 55. The pressure to be applied to the hydrogen by the compressor 50 in order to enable the pressurized hydrogen to be charged into the accumulator 55 depends upon the storage quantity of hydrogen in the accumulator 55. The compressor 50 is thus connected with the controller 60, which receives information relating to the storage quantity of hydrogen in the accumulator 55. The controller 60 regulates the driving amount of the compressor 50.

The accumulator 55 stores the gaseous hydrogen under pressure and has a pressure sensor 56. The pressure sensor 56 measures the pressure in the accumulator 55, and the observed pressure is input into the controller 60 as information relating to the storage quantity of hydrogen in the accumulator 55. As described previously, the storage of hydrogen into the accumulator 55 is implemented by pressuring the gaseous hydrogen with the compressor 50. The degree of pressurization is regulated by the controller 60, based on the information detected by the pressure sensor 56. The storage capacity of hydrogen in the accumulator 55 is set to be not less than the storage capacity of hydrogen in the fuel tank 92 mounted on the electric vehicle 90 as discussed later. The hydrogen supply path 22, to which the supply of hydrogen is fed from the accumulator 55, is provided with a valve 58 that is arranged in the vicinity of the joint with the accumulator 55. The ON/OFF state of the valve 58 is controlled by the controller 60, in order to regulate the flow of hydrogen fed to the electric vehicle 90 via the hydrogen supply path 22. The accumulator 55 has a hydrogen supply monitor 57, which multiplies the flow of hydrogen discharged from the accumulator 55 to the hydrogen supply path 22 by the time period of hydrogen discharge when the supply of hydrogen is fed to the fuel tank 92 in the electric vehicle 90. The product calculated by the hydrogen supply monitor 57 is input into the controller 60, which accordingly calculates the quantity of hydrogen supplied to the fuel tank 92 in the electric vehicle 90. In accordance with one modified arrangement, the hydrogen supply monitor 57 calculates the quantity of hydrogen fed to the fuel tank 92 in the electric vehicle from the difference between the observed values of the pressure sensor 56 under the condition that a sufficient amount of hydrogen is stored in the accumulator 55 and at a predetermined time point.

The controller 60 is constructed as a logic circuit including a microcomputer and has a CPU 62, a ROM 64, a RAM 66, and an input-output port 68. The CPU 62 executes predetermined operations according to preset control programs. Control programs and control data required for a variety of operations executed by the CPU 62 have been stored in advance in the ROM 64. A variety of data required for a variety of operations executed by the CPU 62 are temporarily written in and read from the RAM 66. The input-output port 68 receives detection signals output from the pressure sensor 56 and non-illustrated temperature sensors attached to the evaporator heater 25 and the reformer 30, and outputs driving signals to the gas inlet 11 and the compressor 50, based on the results of the operations by the CPU 62, thereby controlling the driving conditions of the respective constituents of the hydrogen generator supplier 10.

The connector 70 is the structure that connects the hydrogen generator supplier 10 with the electric vehicle 90. As described previously, the connector 70 is formed on the free end of the connection tube 82 extending from the main body 80 of the hydrogen generator supplier 10. The hydrogen supply path 22 is formed inside the connection tube 82. The connector 70 has a hydrogen flow path connector element 76 as an end structure of the hydrogen supply path 22. The electric vehicle 90 has the connector-receptor 110 that corresponds to this connector 70. The connector-receptor 110 is provided with a hydrogen flow path connecting element 116 that mates with the hydrogen path connector element 76. Joining the connector 70 with the connector-receptor 110 causes the hydrogen flow path connector element 76 to be connected to the hydrogen flow path connecting element 116. This connects the hydrogen supply path 22 to the electric vehicle 90 and enables the supply of hydrogen to be fed to the electric vehicle 90.

A signal line 29 is laid, in addition to the hydrogen supply path 22, inside the connection tube 82. The connector 70 has a connection terminal 78 as an end structure of this signal line 29. The signal line 29 is connected with the controller 60. Joining the connector 70 with the connector-receptor 110 and thereby connecting the signal line 29 with a signal line 119 arranged in the electric vehicle 90 as discussed later enables specific pieces of information to be transmitted between the hydrogen generator supplier 10 and the electric vehicle 90. The specific pieces of information transmitted between the hydrogen generator supplier 10 and the electric vehicle 90 include information relating to the quantity of hydrogen in the fuel tank 92 of the electric vehicle 90 and information that is mutually used to monitor the abnormality by the hydrogen generator supplier 10 and the electric vehicle 90.

The water inlet 26 is the structure formed on the free end of the water supply tube 86 as discussed above. The water supply path 27 formed inside the water supply tube 86 is open at the water inlet 26. The water inlet 26 is connectable with the water piping via a specific structure, such as a faucet, as described previously. The water supply path 27 having the open end at the water inlet 26 has the other end that is connected with the desulfurized gas supply conduit 14, through which the desulfurized gas output from the purifier 20 is fed to the evaporator heater 25. The water inlet 26 is provided with a non-illustrated solenoid valve, and the ON/OFF state of the solenoid valve is controlled by the controller 60. When the predetermined start switch mounted on the hydrogen generator supplier 10 is operated to input an instruction for starting the hydrogen generator supplier 10, the solenoid valve is controlled by the controller 60 to be set in the ON position at a predetermined timing. This starts the supply of water, which is required for the reforming reactions, to the desulfurized gas flowing through the desulfurized gas supply conduit 14. When the reactions for producing hydrogen proceed in the hydrogen generator supplier 10 to produce a required quantity of hydrogen and store the hydrogen in the accumulator 55, the solenoid valve is controlled by the controller 60 to be set in the OFF position and cut off the supply of water to the desulfurized gas.

The hydrogen generator supplier 10 has a non-illustrated, predetermined joint structure that connects with a commercial power source and receives a supply of required electric power. The electric power fed from the commercial power source via the joint structure is used to operate the controller 60 and drive the compressor 50. In accordance with another possible application, the hydrogen generator supplier 10 may have a battery to supply the required electric power, instead of joining with the commercial power source and receiving a supply of electric power.

The hydrogen generator supplier 10 has a pair of grips 81 arranged at predetermined positions on side faces as shown in FIG. 2. Although only one grip 81 is illustrated in FIG. 2, the grips 81 are formed in both side faces. After the gas inlet 11, the connector 70, and the water inlet 26 are disconnected respectively from the piping of the city gas, the connector-receptor 110, and the water piping, the user can readily carry the hydrogen generator supplier 10 with the grips 81.

Referring to FIG. 4, the following describes the structure of the electric vehicle 90 that receives the supply of hydrogen fed from the hydrogen generator supplier 10 having the structure discussed above. The electric vehicle 90 includes the fuel tank 92, the fuel cells 100, the connector-receptor 110, and a controller 120, in addition to conventionally required constituents of the vehicle, such as the motor 140. The following description regards the structure corresponding to the essential part of the present invention in the electric vehicle 90.

The fuel tank 92 stores the gaseous hydrogen supplied from the hydrogen generator supplier 10 and feeds a supply of hydrogen to the fuel cells 100 according to the requirements. The fuel tank 92 includes a hydrogen storage alloy, which hydrogen is absorbed by and stored in. There are various types of hydrogen storage alloys that are different in weight of the hydrogen storage alloy, the storage capacity of hydrogen, the quantity of heat evolved in the storage of hydrogen, the quantity of heat required for the release of hydrogen, and the pressure required for the operation. The hydrogen storage alloy applied for automobiles is an alloy that enables storage and release of hydrogen at relatively low temperatures (not higher than 100° C.) and low pressures (not higher than 10 kg/cm²) (for example, a titanium alloy or a rare earth element alloy).

The fuel tank 92 is connected to a hydrogen supply conduit 117, through which a supply of hydrogen flows, and a fuel supply conduit 93 that leads the hydrogen released from the hydrogen storage alloy in the fuel tank 92 to the fuel cells 100. The gaseous hydrogen produced by the hydrogen generator supplier 10 is fed into the fuel tank 92 via the connector-receptor 110 joining with the connector 70 and the hydrogen supply conduit 117, and is absorbed by the hydrogen storage alloy to be stored in the fuel tank 92. The hydrogen released from the hydrogen storage alloy in the fuel tank 92 is fed as the gaseous fuel to the fuel cells 100 via the fuel supply conduit 93.

The fuel supply conduit 93 has a valve 93A. The valve 93A is connected with the controller 120, and the ON/OFF state of the valve 93A is controlled by the controller 120. The quantity of gaseous fuel fed to the fuel cells 100 is varied by regulating the ON/OFF state of the valve 93A. This results in regulating the power generation in the fuel cells 100.

The fuel supply conduit 93 is also provided with a humidifier 136 to humidify the gaseous fuel flowing through the fuel supply conduit 93. Humidifying the gaseous fuel with the humidifier 136 effectively prevents polymer electrolyte films included in the fuel cells 100 as discussed later from being dried. The humidifier 136 of the embodiment takes advantage of a porous film to humidify the gaseous fuel. In accordance with a concrete procedure, the gaseous fuel supplied from the fuel tank 92 and hot water are separated from each other via the porous film at a predetermined pressure, so that a certain amount of water vapor is transmitted from the hot water to the gaseous fuel via the porous film. The hot water used for the humidification is, for example, cooling water circulating on the surface of the fuel cells 100. The fuel cells 100 of the embodiment are polymer electrolyte fuel cells. The cooling water is circulated on the surface of the fuel cells 100, in order to keep the operating temperature in a temperature range of 80 to 100° C. The hot water heated by the fuel cells 100 may be used to humidify the gaseous fuel.

In the course of storing hydrogen in the fuel tank 92, heat is evolved due to the absorption of hydrogen into the hydrogen storage alloy included in the fuel tank 92. The fuel tank 92 has a heat exchange unit 96 as a structure for releasing the heat evolved in the course of storage of hydrogen. The heat exchange unit 96 is defined by a cooling water flow path 115, through which the cooling water is circulated. The cooling water flow path 115 also forms a heat radiation unit 98 at a different position from that of the heat exchange unit 96. The cooling water flow path 115 is arranged inside the fuel tank 92 to form the heat exchange unit 96. Circulation of water in the cooling water flow path 115 enables heat exchange between the cooling water and the fuel tank 92. The heat radiation unit 98 has a radiator structure that forces radiation of heat from the cooling water circulated in the cooling water flow path 115 and cools down the cooling water. The cooling water heated in the heat exchange unit 96 with the heat evolved due to the absorption of hydrogen into the hydrogen storage alloy is cooled down in the heat radiation unit 98, is circulated through the cooling water flow path 115, and is subjected to the heat exchange again in the heat exchange unit 96. The arrangement of the cooling water flow path 115 to remove the heat evolved in the course of absorbing hydrogen into the hydrogen storage alloy accelerates the further absorption of hydrogen into the hydrogen storage alloy and prevents the fuel tank 92 from being excessively heated. A pump 99, which is placed in the cooling water flow path 115, is under the control of the controller 120 and causes the cooling water to be circulated in the cooling water flow path 115. In this embodiment, the cooling water is circulated in the cooling water flow path 115 to cool down the fuel tank 92. A fluid other than water may alternatively be circulated to cool down the fuel tank 92. Another possible modification cools down the fuel tank 92 with the air flow.

A heater unit 95 is attached to the fuel tank 92. The heater unit 95 heats the fuel tank 92 when the hydrogen absorbed and stored in the hydrogen storage alloy is released from the hydrogen storage alloy to be fed to the fuel cells 100, as discussed later in detail.

A remaining hydrogen quantity monitor 97 is also attached to the fuel tank 92. The remaining hydrogen quantity monitor 97 multiplies the quantity of hydrogen supplied from the fuel tank 92 to the fuel cells 100 by the time period of hydrogen supply. The controller 120 calculates the remaining quantity of hydrogen in the fuel tank 92 from the product calculated by the remaining hydrogen quantity monitor 97. The quantity of hydrogen fed from the fuel tank 92 to the fuel cells 100 may be determined by directly measuring the flow of hydrogen running through the fuel supply conduit 93 or may be estimated indirectly from the output of the fuel cells 100.

The fuel cells 100 are polymer electrolyte fuel cells and have a stack structure obtained by laying a plurality of unit cells 108 one upon another. In the fuel cells 100, an anode receives a supply of hydrogen or gaseous fuel, whereas a cathode receives a supply of oxidizing gas containing oxygen. The following electrochemical reactions proceed to generate an electromotive force in the fuel cells 100:

$$H_2 \rightarrow 2H^+ + 2e^- \qquad (4)$$

$$(1/2)O_2 + 2H^+ + 2e^- \rightarrow H_2O \qquad (5)$$

$$H_2 + (1/2)O_2 \rightarrow H_2O \qquad (6)$$

Figure 6:
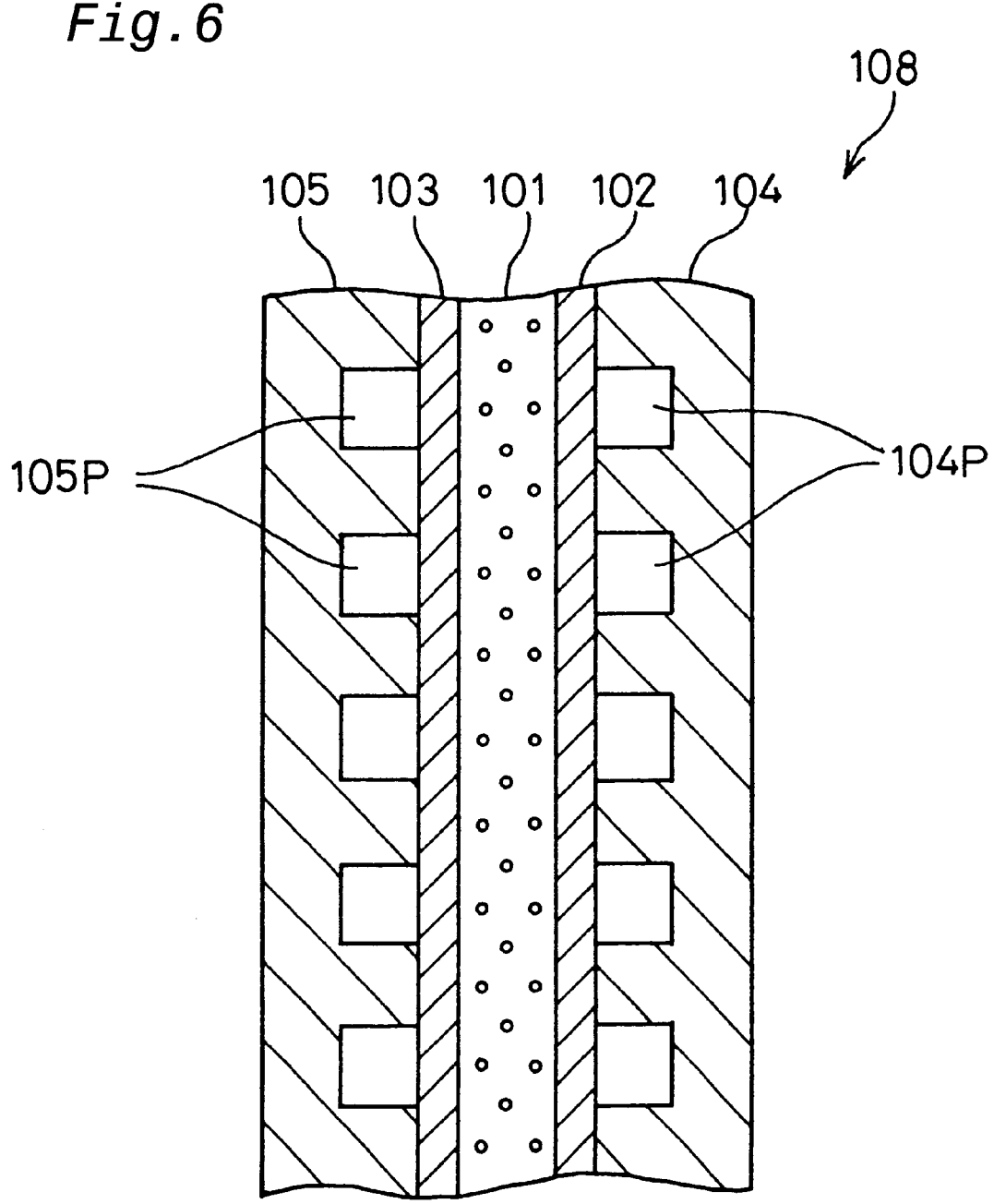
FIG. 6 is a sectional view illustrating the structure of a unit cell 108.

Formula (4) shows the reaction occurring at the anode in the fuel cells; Formula (5) shows the reaction occurring at the cathode in the fuel cells; and Formula (6) shows the reaction occurring as a whole in the fuel cells. FIG. 6 is a sectional view illustrating the structure of the unit cell 108 included in the stack of fuel cells 100. The unit cell 108 includes an electrolyte film 101, an anode 102, a cathode 103, and separators 104 and 105.

The anode 102 and the cathode 103 are gas diffusion electrodes that are placed across the electrolyte film 101 to form a sandwich-like structure. The separators 104 and 105 are placed across the sandwich-like structure and are joined with the anode 102 and the cathode 103 to define flow paths of gaseous fuel and of oxidizing gas, respectively. Flow paths of gaseous fuel 104P are formed between the anode 102 and the separator 104, whereas flow paths of oxidizing gas 105P are formed between the cathode 103 and the separator 105. Although the flow paths are formed only on the single faces of the separators 104 and 105 in the drawing of FIG. 4, ribs are actually formed in both faces of the separators 104 and 105. Namely one face of each separator is joined with the anode 102 to define the flow paths of gaseous fuel 104P, and the other face of the separator is joined with the cathode 103 to define the flow paths of oxidizing gas 105P. The separators 104 and 105 are in contact with the gas diffusion electrodes to form the gas flow paths, and have the function of separating the flow of gaseous fuel in one unit cell from the flow of oxidizing gas in an adjoining unit cell. When a plurality of unit cells 108 are laid one upon another to constitute the stack structure, two separators located on either end of the stack structure may have ribs formed only in the respective single faces that are in contact with the gas diffusion electrodes.

The electrolyte film 101 is a proton-conductive ion exchange film composed of a polymer electrolyte material, for example, a fluororesin, and shows favorable electrical conductivity in the wet state. In this embodiment, a Nafion film (manufactured by du Pont) is used for the electrolyte film 101. Platinum or a platinum alloy is applied as the catalyst on the surface of the electrolyte film 101. The method of applying the catalyst prepares carbon powder with platinum or a platinum alloy carried thereon, disperses the catalyst-carried carbon powder in an appropriate organic solvent, adds an adequate amount of an electrolytic solution (for example, Nafion solution manufactured by Aldrich Chemical Corp.) to the dispersion to form a paste, and screen prints the paste on the electrolyte film 101. Another available technique forms the paste containing the catalyst-carried carbon powder to a sheet and presses the sheet onto the electrolyte film 101. The catalyst, such as platinum, may be applied on the anode 102 and the cathode 103, instead of the electrolyte film 101.

The anode 102 and the cathode 103 are made of carbon cloth, which is woven of yarns consisting of carbon fibers. Although the anode 102 and the cathode 103 are composed of carbon cloth in this embodiment, carbon paper and carbon felt consisting of carbon fibers are also favorably applicable for the material of the anode 102 and the cathode 103.

The separators 104 and 105 are made of a gas-impermeable conductive material, for example, gas-impermeable, dense carbon obtained by compressing carbon. Each of the separators 104 and 105 has a plurality of ribs formed in parallel in either face thereof. As described previously, each of the separators 104 and 105 is joined with the surface of the anode 102 of one unit cell 108 to define the flow paths of gaseous fuel 104P and with the surface of the cathode 103 of an adjoining unit cell 108 to define the flow paths of oxidizing gas 105P. The ribs formed in either face of each separator may have any shape that allows the supplies of gaseous fuel and oxidizing gas to the gas diffusion electrodes, although the ribs are a plurality of grooves formed in parallel in this embodiment. The ribs formed in the respective faces of each separator may be arranged at predetermined angles, for example, at right angles.

The unit cell 108, which is the basic unit of the fuel cells 100, has the structure discussed above. The separator 104, the anode 102, the electrolyte film 101, the cathode 103, and the separator 105 are laid one upon another in this sequence to constitute each unit cell 108. The stack structure is completed by laminating plural sets of these unit cells 108 (100 sets in this embodiment) and disposing current collector plates 106 and 107 composed of dense carbon or copper on both ends of the laminate. Although the polymer electrolyte fuel cells are applied for the fuel cells 100 in this embodiment, any other fuel cells utilizing hydrogen as the gaseous fuel, for example, phosphate fuel cells, may be mounted on the electric vehicle 90.

Referring back to FIG. 4, in the electric vehicle 90, hydrogen absorbed by and stored in the hydrogen storage alloy included in the fuel tank 92 is released from the hydrogen storage alloy, supplied as the gaseous fuel to the anodes in the fuel cells 100 via the fuel supply conduit 93, and subjected to the electrochemical reactions in the flow paths of gaseous fuel 104P. The protons generated by the reaction of Formula (4) on the anode side of the electrolyte film 101 are hydrated and move to the cathode side. Water is accordingly consumed on the cathode side. The gaseous fuel is humidified as mentioned above to supplement the water content required for the electrolyte film 101. Gaseous fuel exhaust after the electrochemical reactions is discharged from the flow paths of gaseous fuel 104P to a fuel exhaust discharge path 94. The fuel exhaust discharge path 94 is connected to the fuel supply conduit 93, so that the gaseous fuel exhaust is fed again as the gaseous fuel to the fuel cells 100. A pump 138 is placed in the fuel exhaust discharge path 94 to pressurize the gaseous fuel exhaust and supply the pressurized gaseous fuel exhaust to the fuel supply conduit 93.

The fuel exhaust discharge path 94 is further connected to the heater unit 95 attached to the fuel tank 92, and the gaseous fuel exhaust is thus used as the fuel of combustion in the heater unit 95. The oxidizing gas, that is, the air, is fed to the flow paths of oxidizing gas 105P through an oxidizing gas supply conduit 132. The oxidizing gas supply conduit 132 has a compressor 130, which pressurizes the air ingested from the outside and feeds the pressurized air to the fuel cells 100. Oxidizing gas exhaust after the electrochemical reactions is discharged from the flow paths of oxidizing gas 105P to an oxidizing gas exhaust discharge path 134 and fed to the heater unit 95 like the gaseous fuel exhaust.

Combustion is carried out in the heater unit 95 by utilizing the gaseous fuel exhaust and the oxidizing gas exhaust supplied to the heater unit 95, in order to heat the fuel tank 92. As discussed previously, the absorption of hydrogen into the hydrogen storage alloy is an exothermic reaction, whereas the release of hydrogen from the hydrogen storage alloy is an endothermic reaction. The supply of heat from the outside is accordingly required to take the absorbed hydrogen out of the hydrogen storage alloy. In the electric vehicle 90 of the embodiment, the required heat is supplied by the combustion utilizing the gaseous fuel exhaust and the oxidizing gas exhaust.

The controller 120 is constructed as a logic circuit including a microcomputer and has a CPU 122, a ROM 124, a RAM 126, and an input-output port 128. The CPU 122 executes predetermined operations according to preset control programs. Control programs and control data required for a variety of operations executed by the CPU 122 have been stored in advance in the ROM 124. A variety of data required for a variety of operations executed by the CPU 122 are temporarily written in and read from the RAM 126. The input-output port 128 receives signals from the hydrogen generator supplier 10 and outputs driving signals to the compressor 130 and the other elements relating to the operation of the fuel cells 100, based on the results of operations by the CPU 122, thereby controlling the driving conditions of the respective constituents of the electric vehicle 90.

The connector-receptor 110 is the structure disposed at a predetermined position on the outer surface of the electric vehicle 90 and is connectable with the connector 70 included in the hydrogen generator supplier 10. The connector-receptor 110 has the hydrogen flow path connecting element 116 and a connection terminal 118. The hydrogen flow path connecting element 116 is an end structure of the hydrogen supply conduit 117, and the connection terminal is an end structure of the signal line 119 that connects with the controller 120. Fitting the connector 70 in the connector-receptor 110 simultaneously connects the hydrogen flow path connector element 76 with the hydrogen flow path connecting element 116 and enables a supply of hydrogen from the hydrogen supply path 22 in the hydrogen generator supplier 10 to the hydrogen supply conduit 117 in the electric vehicle 90. Fitting the connector 70 in the connector-receptor 110 also simultaneously connects the connection terminal 78 with the connection terminal 118 and enables transmission of specific pieces of information between the hydrogen generator supplier 10 and the electric vehicle 90.

As discussed above, the electric power produced by the electrochemical reactions in the fuel cells 100 is supplied to the motor 140 to generate a rotational driving force in the motor 140. The rotational driving force is transmitted to front wheels and/or rear wheels of the vehicle via an axle of the electric vehicle 90 and is used as the power for running the vehicle. The motor 140 is under the control of a control unit 142. The control unit 142 is connected with an accelerator pedal position sensor 142b that detects a step-on amount of an accelerator pedal 142a. The control unit 142 is also connected to the controller 120, so that various pieces of information, for example, relating to the driving operation of the motor 140, are transmitted between the control unit 142 and the controller 120.

The electric vehicle 90 has a non-illustrated storage battery. In the case where loading is increased, for example, at the time of an up-slope run or a high-speed run of the electric vehicle 90, the storage battery supplements the electric power supplied to the motor 140, so as to ensure the high driving force. The storage battery also supplies the electric power required for operating the controller 120 and circulating water in the cooling water flow path 115 when a supply of hydrogen is fed to the fuel tank 92 in the electric vehicle 90.

Figure 7:
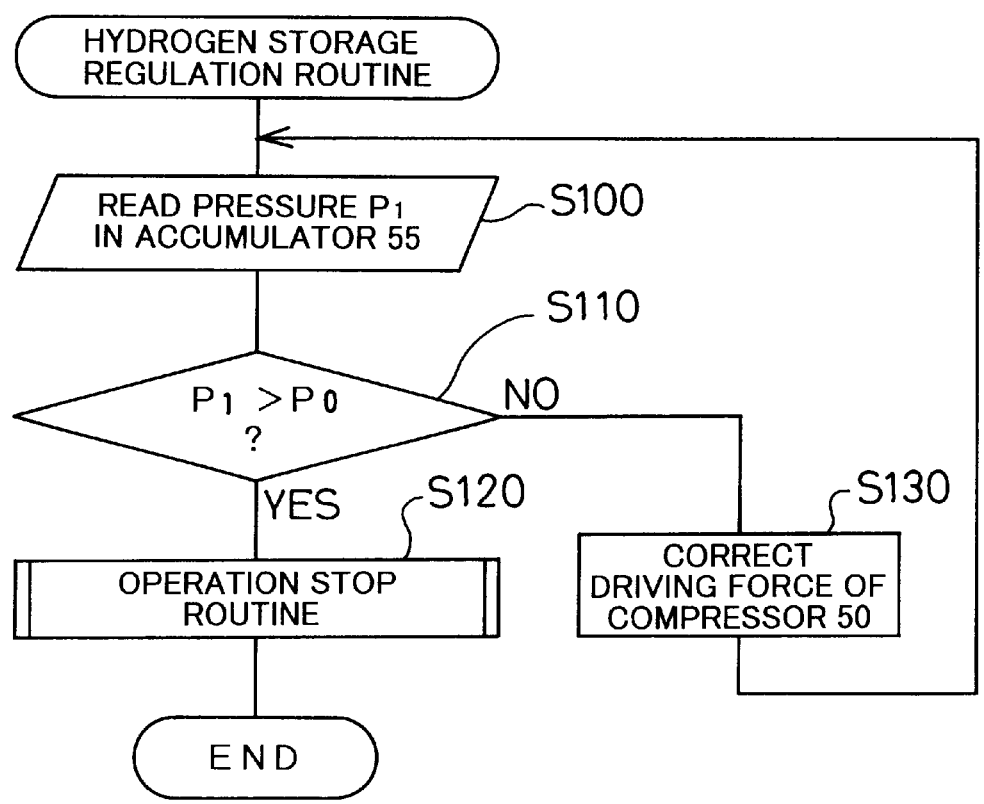
FIG. 7 is a flowchart showing a procedure of regulating the quantity of hydrogen produced and stored by the hydrogen generator supplier 10.

The above description regards the structure of the hydrogen generator supplier 10 and the electric vehicle 90 of the present invention. The following describes the regulation to ensure storage of a sufficient quantity of hydrogen into the accumulator 55 in the course of generating hydrogen in the hydrogen generator supplier 10. FIG. 7 is a flowchart showing a hydrogen storage regulation routine executed in the course of generating hydrogen in the hydrogen generator supplier 10.

When a predetermined start switch mounted on the hydrogen generator supplier 10 is turned ON, supplies of the city gas and water to the hydrogen generator supplier 10 start to initiate a series of reactions for producing hydrogen. The controller 60 executes the hydrogen storage regulation routine shown in the flowchart of FIG. 7 at predetermined time intervals, in order to ensure storage of a predetermined amount of hydrogen in the accumulator 55. In this embodiment, this routine is executed at every several msec.

When the program enters the routine, the CPU 62 first reads information relating to a pressure P1 in the accumulator 55 measured by the pressure sensor 56 (step S100). The input value of the pressure P1 is compared with a preset reference value P0 (step S110). Here the reference value P0 is set to be not less than a storage capacity of hydrogen in the fuel tank 92 of the electric vehicle 90 and is stored in the controller 60 as a value of pressure in the accumulator 55 corresponding to a specific quantity of hydrogen stored in the accumulator 55 in order to feed a supply of hydrogen to the electric vehicle 90.

In the case where the pressure P1 in the accumulator 55 is not greater than the reference value P0 at step S110, it is determined that the quantity of hydrogen stored in the accumulator 55 is still insufficient. The program then corrects the driving conditions of the compressor 50 based on the pressure P1 in the accumulator 55 read at step S100 (step S130), and returns to step S100 to read the pressure P1 in the accumulator 55 again. While the hydrogen storage regulation routine is being executed, storage of hydrogen proceeds in the accumulator 55. With an increase in quantity of hydrogen in the accumulator 55, it is required to increase the degree of pressurization of hydrogen by the compressor 50. In this embodiment, while the storage of hydrogen in the accumulator 55 is insufficient, the driving conditions of the compressor 50 are corrected, based on the pressure P1 read at step S100.

In the case where the pressure P1 in the accumulator 55 exceeds the reference value P0 at step S110, on the other hand, it is determined that a sufficient quantity of hydrogen is stored in the accumulator 55. The program then proceeds to step S120 to execute an operation stop routine. The operation stop routine is a sub-routine to carry out the processing relating to an automatic stop of the hydrogen generator supplier 10. A concrete procedure of the operation stop routine outputs driving signals to the gas inlet 11 and the water inlet 26 to set the solenoid valves attached thereto in the OFF position, thereby stopping the supplies of the city gas and water to the hydrogen generator supplier 10. The procedure also stops the compressor 50 and the other elements relating to the production and storage of hydrogen and ceases the supply of electric power to the hydrogen generator supplier 10. After the operation stop routine is executed at step S120 to stop the hydrogen generator supplier 10, the program exits from the hydrogen storage regulation routine.

The above description regards the operation carried out in the course of production and storage of hydrogen in the hydrogen generator supplier 10. The following describes the operations when hydrogen stored in the hydrogen generator supplier 10 is fed to the electric vehicle 90. When the connector 70 of the hydrogen generator supplier 10 is joined with the connector-receptor 110 of the electric vehicle 90 and a predetermined start switch mounted on the hydrogen generator supplier 10 is turned ON, the controller 60 executes a hydrogen charging control routine shown in the flowchart of FIG. 8 at predetermined time intervals, in order to control the supply of hydrogen to the electric vehicle 90. In this embodiment, this routine is executed at every several msec.

When the program enters the routine, the CPU 62 first reads the volume of the fuel tank 92 (step S200). This process is carried out especially for the electric vehicle having fuel tanks of different volumes. The information relating to the volume of the fuel tank 92 is stored in advance in the controller 120 of the electric vehicle 90. The CPU 62 subsequently reads the remaining quantity of hydrogen in the fuel tank 92 (step S210). The remaining quantity of hydrogen in the fuel tank 92 is stored in the controller 120 of the electric vehicle 90 as a value calculated from the consumption of hydrogen integrated by the remaining hydrogen quantity monitor 97. The values representing the volume of the fuel tank 92 and the remaining quantity of hydrogen in the fuel tank 92 are transmitted from the electric vehicle 90 to the controller 60 of the hydrogen generator supplier 10 via the signal lines 29 and 119 connecting with each other in the connector 70 and the connector-receptor 110.

The CPU 62 then calculates a required supply V0 to be fed from the hydrogen generator supplier 10 to the electric vehicle 90, based on the input values representing the volume of the fuel tank 92 and the remaining quantity of hydrogen in the fuel tank 92 (step S220). After calculating the required supply V0, the CPU 62 gives an instruction to start a supply of hydrogen to the electric vehicle 90 (step S230). A concrete procedure of giving the instruction to start a supply of hydrogen outputs a driving signal to the valve 58, which is disposed in the vicinity of the joint of the accumulator 55 with the hydrogen supply path 22. In response to the instruction, the hydrogen stored in the accumulator 55 is fed at a specified pressure to the fuel tank 92 via the hydrogen supply path 22 and the hydrogen supply conduit 117. The pressure of hydrogen fed from the accumulator 55 to the fuel tank 92 is regulated according to the ON/OFF state of the valve 58, which depends upon the remaining quantity of hydrogen in the fuel tank 92.

When the supply of hydrogen to the fuel tank 92 starts, the CPU 62 reads an actual supply V1 of hydrogen fed to the fuel tank 92 (step S240). The actual supply V1 of hydrogen is calculated from the information input from the hydrogen supply monitor 57 included in the accumulator 55. The actual supply V1 of hydrogen is subsequently compared with the required supply V0 calculated at step S220 (step S250).

In the case where the required supply V0 is greater than the actual supply V1, it is determined that the quantity of hydrogen fed to the fuel tank 92 is still insufficient. The program then returns to step S240 and reads the actual supply V1 of hydrogen fed to the fuel tank 92 again. Until a sufficient quantity of hydrogen is fed to the fuel tank 92, the program repeats the procedure of reading the actual supply V1 of hydrogen and comparing the actual supply V1 with the required supply V0.

In the case where the actual supply V1 of hydrogen exceeds the required supply V0 at step S250, on the other hand, the CPU 62 gives an instruction to stop the supply of hydrogen from the hydrogen generator supplier 10 to the electric vehicle 90 (step S260) and exits from this routine. A concrete procedure of giving the instruction to stop the supply of hydrogen outputs a driving signal to set the valve 58, which is disposed at the joint of the accumulator 55 with the hydrogen supply path 22, in the OFF state as well as a signal to stop the pump 99, which circulates the cooling water in the fuel tank 92 of the electric vehicle 90, to the electric vehicle 90 via the signal lines 29 and 119.

In this embodiment, the information relating to the volume of the fuel tank 92 is stored in the controller 120 and transmitted from the electric vehicle 90 to the hydrogen generator supplier 10 via the signal line 119. In accordance with one possible modification, the user manually inputs the volume of the fuel tank 92 that is mounted on the electric vehicle and receives the supply of hydrogen, into the hydrogen generator supplier 10.

The hydrogen generator supplier 10 of the embodiment thus constructed can produce hydrogen from the city gas, which is supplied to each house as the commercial gas. This arrangement enables hydrogen to be widely available for the fuel of electric vehicles without founding a new distribution system to ensure distribution of hydrogen. For example, the user of the electric vehicle 90 places the hydrogen generator supplier 10 in the house, which produces hydrogen by utilizing the city gas supplied to each house and enables the supply of hydrogen to the electric vehicle 90. This arrangement enables hydrogen to be readily produced and used for the fuel of electric vehicles at the individual level. The high availability of hydrogen for the fuel of electric vehicles accelerates the spread of electric vehicles having less emission and thereby protects the global environment from further pollution.

The hydrogen generator supplier 10 of the embodiment has the structure of storing the hydrogen in the accumulator 55 to enable a supply to the electric vehicle 90. This structure is free from the influence of the electric vehicle 90, such as the driving conditions of the electric vehicle 90, in the course of producing hydrogen. The reforming reactions for producing hydrogen are accordingly performed at an arbitrary rate in the reformer 30. Namely this arrangement ensures the reforming reactions under the optimum conditions and thereby realizes the high energy efficiency in the reformer 30. Performing the reforming reactions under the optimum conditions attains a favorably slow rate of the reforming reactions and thereby improves the durability of the catalyst. The optimization of the reaction conditions also enables size reduction of the reformer 30 and the other related elements.

The hydrogen generator supplier 10 of the embodiment stops the operation of producing hydrogen when the quantity of hydrogen stored in the accumulator 55 reaches a preset level. This arrangement effects the automatic production and storage of hydrogen. The user starts the operation of the hydrogen generator supplier 10 before driving out the electric vehicle 90. A required amount of hydrogen is then produced and stored in the hydrogen generator supplier 10 without any labor of the user. After going home, the user can start a supply of hydrogen to the fuel tank 92 of the electric vehicle 90. The structure of the embodiment stops the supply of hydrogen from the hydrogen generator supplier 10 to the electric vehicle 90 when a sufficient amount of hydrogen is fed into the fuel tank 92 of the electric vehicle 90. This arrangement effects the automatic supply of hydrogen from the hydrogen generator supplier 10 to the fuel tank 92. The user starts the supply of hydrogen to the fuel tank 92 after driving home. The electric vehicle 90 with the required amount of hydrogen is then prepared for a next drive (on next morning, for example). In the hydrogen generator supplier 10 of the embodiment, the accumulator 55 has the storage capacity of hydrogen that is greater than the storage capacity of hydrogen in the fuel tank 92 of the electric vehicle 90. Even when the hydrogen in the fuel tank 92 is mostly used up, the structure of storing a sufficient quantity of hydrogen in the accumulator 55 enables a required amount of hydrogen to be fed quickly to the fuel tank 92.

The hydrogen generator supplier 10 and the electric vehicle 90 of the embodiment respectively have the connector 70 and the connector-receptor 110. Joining the connector 70 with the connector-receptor 110 effects the simultaneous and quick connections of the hydrogen supply path 22 with the hydrogen supply conduit 117 and of the signal line 29 with the signal line 119.

The hydrogen generator supplier 10 of the embodiment has the grips 81 formed in either side face thereof to facilitate the carriage of the hydrogen generator supplier 10. The user can thus move the hydrogen generator supplier 10 to an arbitrary position where the gas inlet 11 and the water inlet 26 are connectable with the piping of city gas and the water piping, and produce hydrogen. Instead of the moving the hydrogen generator supplier 10 to the arbitrary position, the hydrogen generator supplier 10 may be installed at a fixed position in the house and the gas inlet 11 and the water inlet 26 are respectively fixed to predetermined joints of the city gas piping and the water piping.

The electric vehicle 90 of the embodiment stores hydrogen by making the hydrogen absorbed in the hydrogen storage alloy. During a run of the vehicle, hydrogen is present in the gaseous state only in the fuel supply conduit 93, the fuel cells 100, and the fuel exhaust discharge path 94. This arrangement reduces the loss of hydrogen when the vehicle is at a stop over a relatively long time period.

In the electric vehicle 90 that receives a supply of hydrogen from the hydrogen generator supplier 10 of the first embodiment, the heat evolved in the course of the supply of hydrogen to the fuel tank 92 including the hydrogen storage alloy is taken out of the fuel tank 92 by circulating the cooling water through the heat exchange unit 96. The heat is then released to the outside by cooling down the cooling water in the heat radiation unit 98 included in the electric vehicle 90. One possible modification installs the heat radiation unit for cooling down the cooling water in the hydrogen generator supplier 10. In the electric vehicle 90 of the first embodiment, the fuel tank 92 has the heater unit 95 that supplies a required quantity of heat for releasing the hydrogen from the hydrogen storage alloy in the fuel tank 92. The heat produced in a predetermined hot section in the electric vehicle, for example, the fuel cells 100, may alternatively be utilized to release hydrogen from the fuel tank 92. This modified structure is described below as a second embodiment according to the present invention.

Figure 9:
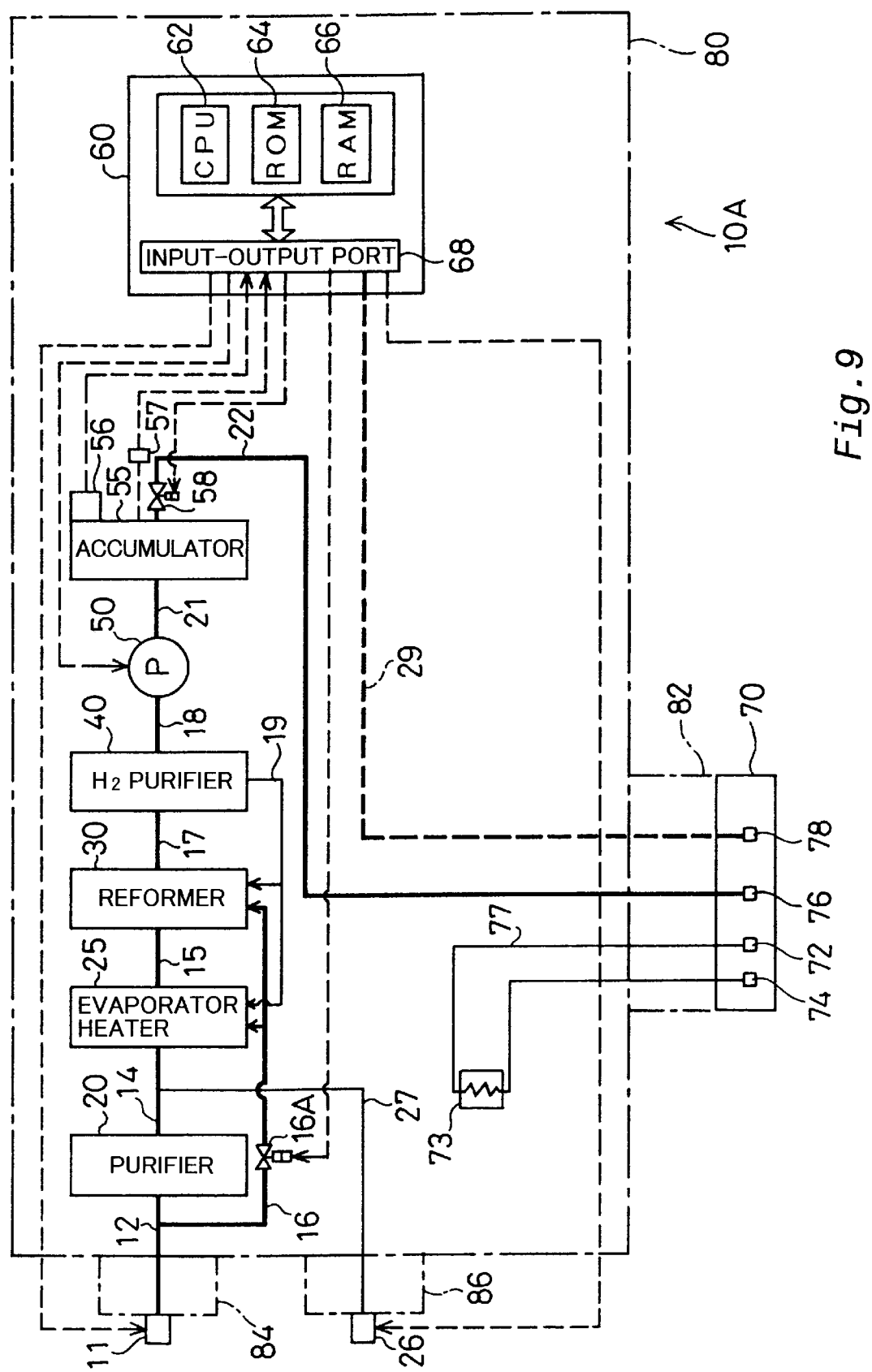
FIG. 9 is a block diagram illustrating the structure of a hydrogen generator supplier 10A in a second embodiment according to the present invention.
Figure 10:
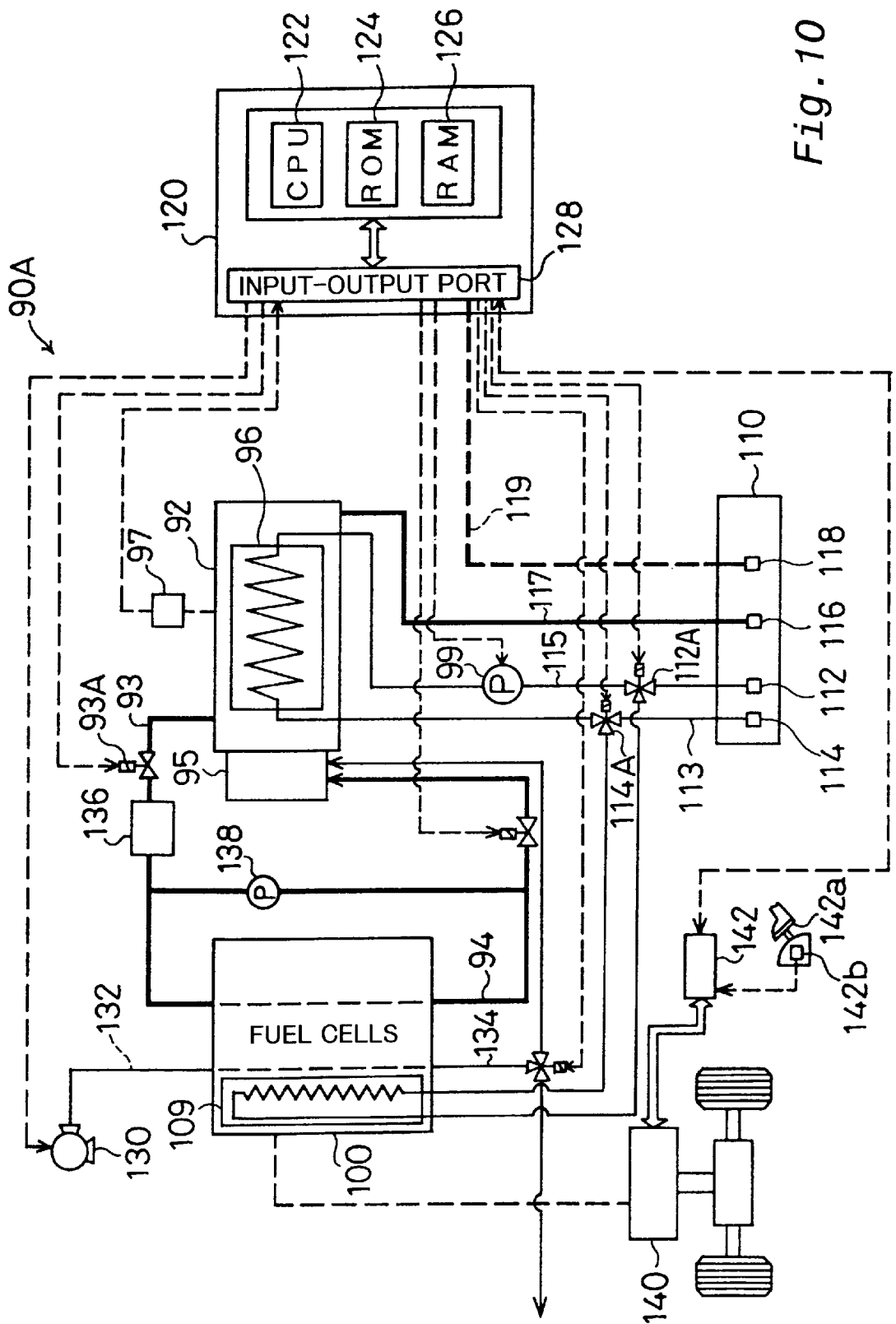
FIG. 10 is a block diagram illustrating the structure of an electric vehicle 90A in the second embodiment.

FIGS. 9 and 10 schematically illustrate the structures of a hydrogen generator supplier 10A and an electric vehicle 90A in the second embodiment, respectively. The hydrogen generator supplier 10A and the electric vehicle 90A of the second embodiment have similar structures to those of the hydrogen generator supplier 10 and the electric vehicle 90 of the first embodiment. Only the configuration different from the first embodiment is discussed below, and the constituents identical with those of the first embodiment are shown by the same numerals and are not specifically described here.

In the electric vehicle 90A of the second embodiment, the cooling water flow path 115, through which the cooling water for cooling down the fuel tank 92 runs, is not formed as a closed pipe line inside the electric vehicle 90A like the first embodiment, but is open at the connector-receptor 110. One end of the cooling water flow path 115 forms a water flow path connecting element 112 at the position of the connector-receptor 110. The cooling water flow path 115 forms the heat exchange unit 96 in the fuel tank 92 and then functions as a hot water flow path 113. One end of the hot water flow path 113 forms a hot water flow path connecting element 114 that is open at the connector-receptor 110. Joining the connector-receptor 110 of the electric vehicle 90A with the connector 70 of the hydrogen generator supplier 10A enables the cooling water to be led from the hydrogen generator supplier 10A to the electric vehicle 90A via the water flow path connecting element 112. When a supply of hydrogen is fed from the hydrogen generator supplier 10A to the fuel tank 92 via the connector-receptor 110, the cooling water led via the water flow path connecting element 112 is subjected to the heat exchange carried out in the heat exchange unit 96 of the fuel tank 92 and is thereby heated. The hot cooling water is introduced into the hydrogen generator supplier 10 via the hot water flow path connecting element 114.

In the hydrogen generator supplier 10A of the second embodiment, the connector 70 has a water flow path connector element 72 and a hot water flow path connector element 74, which are respectively connectable with the water flow path connecting element 112 and the hot water flow path connecting element 114, at the positions corresponding to the water flow path connecting element 112 and the hot water flow path connecting element 114. The water flow path connector element 72 and the hot water flow path connector element 74 are end structures of a cooling water flow path 77 laid in the hydrogen generator supplier 10A. The cooling water flow path 77 forms a heat radiation unit 73 inside the hydrogen generator supplier 10A. The heat radiation unit 73 has the same radiator structure as the heat radiation unit 98 included in the electric vehicle 90 of the first embodiment. The cooling water heated in the heat exchange unit 96 installed in the fuel tank 92 of the electric vehicle 90A is flown into the hydrogen generator supplier 10A via the hot water flow path connecting element 114 and the hot water flow path connector element 74. The cooling water then flows through the cooling water flow path 77 and led into the heat radiation unit 73, where the heat of the cooling water is released and the temperature of the cooling water is lowered. The cooled-down cooling water is introduced into the electric vehicle 90A via the water flow path connector element 72 and the water flow path connecting element 112, and is subjected to the heat exchange again in the heat exchange unit 96, in order to cool down the fuel tank 92. The circulation of the cooling water is attained by the function of the pump 99 disposed in the cooling water flow path 115 in the same manner as the first embodiment.

In the electric vehicle 90A, both the cooling water flow path 115 and the hot water flow path 113 branch off at predetermined positions. The respective branch flow paths are laid in the fuel cells 100 to form a heat exchange unit 109 in the fuel cells 100, and connect with each other in the heat exchange unit 109. The cooling water flow path 115 and the hot water flow path 113 are respectively provided with changeover valves, which change over the flow path, at the positions where the cooling water flow path 115 and the hot water flow path 113 branch into the flow paths for defining the heat exchange unit 109. A changeover valve 112A is disposed at the junction of the cooling water flow path 115, and a changeover valve 114A is disposed at the junction of the hot water flow path 113. These changeover valves 112A and 114A are connected to the controller 120. The flow path is changed over in response to a driving signal output from the controller 120. When a supply of hydrogen is fed into the fuel tank 92 by the hydrogen generator supplier 10A, the changeover valves 112A and 114A are controlled to enable circulation of the cooling water only through the flow paths forming the heat exchange unit 96 and to close the flow paths leading to the heat exchange unit 109. In this case, the cooling water is circulated between the heat exchange unit 96 of the fuel tank 92 and the heat radiation unit 73 of the hydrogen generator supplier 10A as described previously.

When the electric vehicle 90A runs by utilizing hydrogen in the fuel tank 92, on the other hand, the ON/OFF conditions of the changeover valves 112A and 114A are controlled to connect the flow paths defining the heat exchange unit 96 with the flow paths defining the heat exchange unit 109. In this case, the cooling water is circulated between the heat exchange unit 96 of the fuel tank 92 and the heat exchange unit 109 of the fuel cells 100. In the electric vehicle 90A of this embodiment, this structure enables hydrogen to be released from the hydrogen storage alloy by taking advantage of the heat evolved in the fuel cells 100. While the power generation is carried out in the fuel cells 100, the energy that has not been converted into the electrical energy is released as thermal energy, which causes heat in the fuel cells 100. The heat exchange is performed between the fuel cells 100 and the cooling water in the heat exchange unit 109 and thereby keeps the driving temperature of the fuel cells 100 in a specific temperature range of 80 to 100° C. This increases the temperature of the cooling water in the heat exchange unit 109. The supply of heat from the outside is required to take the hydrogen out of the hydrogen storage alloy in the fuel cells 92. The cooling water heated in the heat exchange unit 109 is introduced into the heat exchange unit 96 and gives a required amount of heat to the fuel tank 92. This enables the release of hydrogen from the hydrogen storage alloy and increases the temperature of the cooling water in the heat exchange unit 96. Circulation of the cooling water between the heat exchange unit 109 and the heat exchange unit 96 enables the heat evolved in the fuel cells 100 to be utilized in the fuel tank 92.

Like the electric vehicle 90 of the first embodiment, the electric vehicle 90A of the second embodiment has the heater unit 95 attached to the fuel tank 92. When the fuel cells 100 are at a stationary run, the fuel tank 92 is heated by utilizing the heat evolved in the fuel cells 100. In this embodiment, the heater unit 95 supplements the required quantity of heat fed to the fuel tank 92 when the fuel cells 100 are not sufficiently heated, for example, at the time of starting the electric vehicle 90A. In general, the heater unit 95 supplements the required quantity of heat when the quantity of heat fed from the fuel cells 100 is insufficient. In the case where the quantity of heat fed from the fuel cells 100 via the cooling water is sufficient for the required energy for taking hydrogen out of the hydrogen storage alloy, the heater unit 95 may be omitted from the structure. When there is no combustion in the heater unit 95, the gaseous fuel exhaust discharged to the fuel exhaust discharge path 94 is all returned to the fuel supply conduit 93, and the oxidizing gas exhaust discharged to the oxidizing gas exhaust discharge path 134 is released to the outside.

The hydrogen generator supplier 10A and the electric vehicle 90A of the second embodiment described above exert the following effects, in addition to the same effects as those of the hydrogen generator supplier 10 and the electric vehicle 90 of the first embodiment. The structure of the second embodiment takes advantage of the thermal energy generated in the fuel cells 100 to take the hydrogen out of the hydrogen storage alloy in the fuel tank 92. This arrangement favorably reduces the quantity of hydrogen consumed for heating the fuel tank 92 and thereby improves the energy efficiency of the whole system. The cooling water flowing through the heat exchange unit 96 in the fuel tank 92 is also used as the cooling water for cooling down the fuel cells 100. Compared with the structure having two independent and separate flow systems of the cooling water, this arrangement desirably simplifies the piping structure of the cooling water and the structure for cooling down the cooling water.

In this embodiment, the hydrogen generator supplier 10A has the heat radiation unit 73, which functions to release the heat evolved in the course of the supply of hydrogen into the fuel tank 92 including the hydrogen storage alloy. This arrangement simplifies the structure of the electric vehicle 90A. In the second embodiment, the common pump 99 is used both in the case of circulation of the cooling water between the heat exchange unit 96 and the heat exchange unit 109 and in the case of circulation of the cooling water between the heat exchange unit 96 and the heat radiation unit 73. One modified arrangement may use separate pumps for the respective circulations. By way of example, the electric vehicle 90A has a pump that circulates the cooling water between the heat exchange unit 96 and the heat exchange unit 109, whereas the hydrogen generator supplier 10A has another pump that circulates the cooling water between the heat exchange unit 96 and the heat radiation unit 73.

In the first embodiment and the second embodiment described above, the heat generated in the course of the supply of hydrogen into the fuel tank 92 including the hydrogen storage alloy is taken out of the fuel tank 92 via the circulation of the cooling water in the heat exchange unit 96, and is released to the outside by cooling down the hot cooling water in the heat radiation units 98 and 73. One possible modification does not release but utilizes the heat evolved on the supply of hydrogen. This modified structure is described below as a third embodiment according to the present invention.

Figure 11:
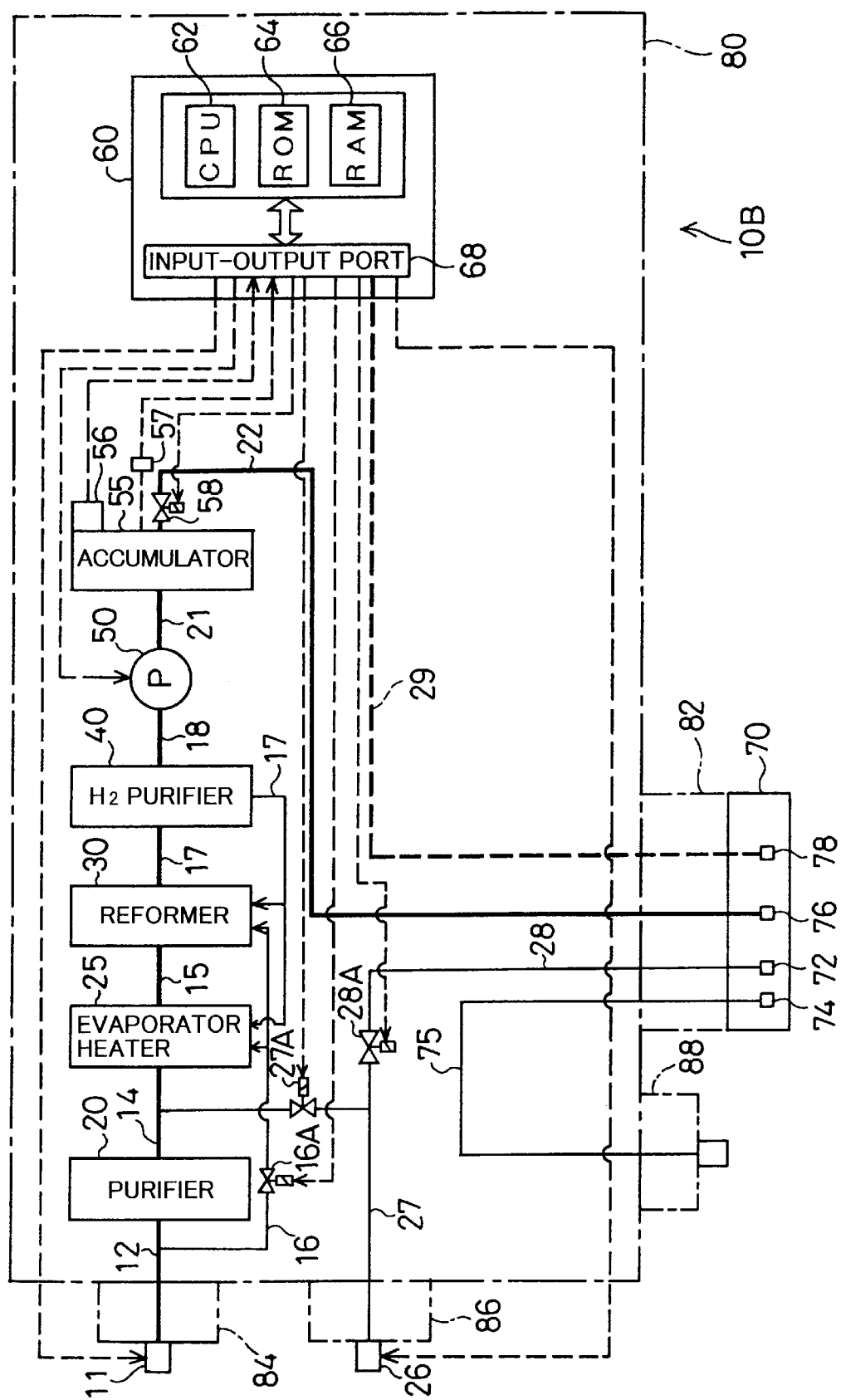
FIG. 11 is a block diagram illustrating the structure of a hydrogen generator supplier 10B in a third embodiment according to the present invention.
Figure 12:
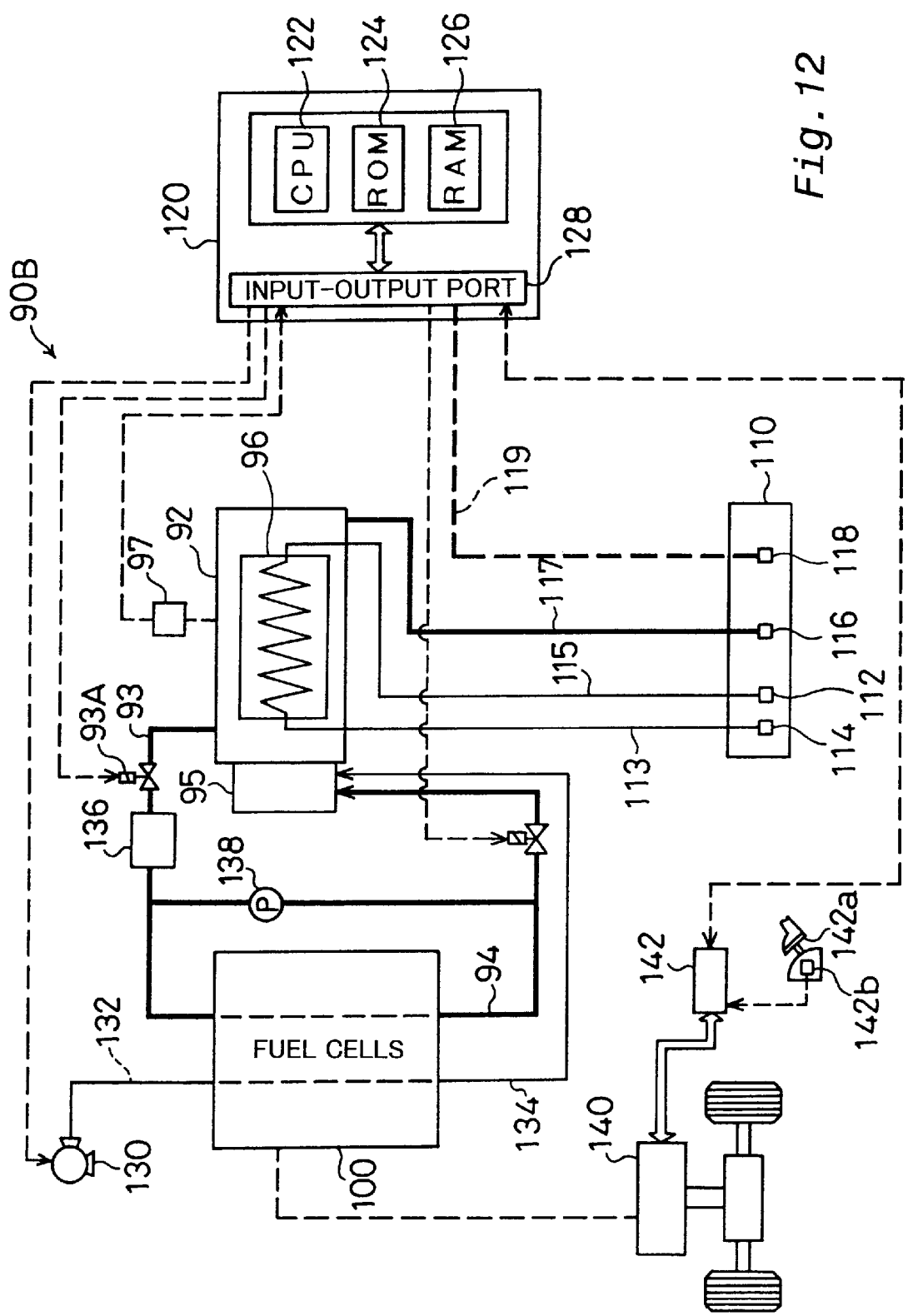
FIG. 12 is a block diagram illustrating the structure of an electric vehicle 90B in the third embodiment.

FIGS. 11 and 12 schematically illustrate the structures of a hydrogen generator supplier 10B and an electric vehicle 90B in the third embodiment, respectively. The hydrogen generator supplier 10B and the electric vehicle 90B of the third embodiment have similar structures to those of the hydrogen generator supplier 10 and the electric vehicle 90 of the first embodiment. Only the configuration different from the first embodiment is discussed below, and the constituents identical with those of the first embodiment are shown by the same numerals and are not specifically described here.

In the hydrogen generator supplier 10B of the third embodiment, the water supply path 27 having one end open to the water inlet 26 has the other end connecting with the desulfurized gas supply conduit 14, and branches off at a predetermined position to form a water supply branch path 28. One end of the water supply branch path 28 is open to the connector 70. The connector 70 has the water flow path connector element 72, which is formed as the end structure of the water supply branch path 28. When the connector 70 is fitted in the connector-receptor 110 of the electric vehicle 90B, the water flow path connector element 72 is joined with the water flow path connecting element 112 of the connector-receptor 110. This enables a supply of water to be fed to the electric vehicle 90B via the water supply branch path 28.

The water supply path 27 has a valve 27A, which is arranged between the position of the joint with the desulfurized gas supply conduit 14 and the position of the junction with the water supply branch path 28. The water supply branch path 28 also has a valve 28A. These valves 27A and 28A are connected to the controller 60, which controls the ON/OFF conditions of these valves. When the valve 27A is in the ON position, a supply of water can be fed to the desulfurized gas flowing through the desulfurized gas supply conduit 14. When the valve 28A is in the ON position, on the other hand, a supply of water can be fed to the electric vehicle 90B.

The hydrogen generator supplier 10B has a hot water flow path 75 formed therein. One end of the hot water flow path 75 is open to the hot water flow path connector element 74 included in the connector 70. When the connector 70 is fitted in the connector-receptor 110, a supply of hot water can be fed from the electric vehicle 90B to the hot water flow path 75. The hydrogen generator supplier 10B also has a hot water supply tube 88, which extends to the outside at a predetermined position. The hot water flow path 75 extends from the hydrogen generator supplier 10A into the hot water supply tube 88. The other end of the hot water supply path 75 is open at one end of the hot water supply tube 88, in order to enable the supply of hot water fed from the electric vehicle 90B to be discharged to the outside.

In the electric vehicle 90B of the third embodiment, the cooling water flow path 115 forming the heat exchange unit 96 inside the fuel tank 92 does not have the ring structure like the first embodiment, but has an open end as the water flow path connecting element 112 included in the connector-receptor 110. When the connector 70 is fitted in the connector-receptor 110, the water flow path connecting element 112 is joined with the water flow path connector element 72 discussed previously. The connection of the cooling water flow path 115 with the water supply branch path 28 enables a supply of water from the certain water piping to be fed as the cooling water to the heat exchange unit 96 via the water inlet 26 and the hydrogen generator supplier 10A.

The cooling water flow path 115 forms the heat exchange unit 96 in the fuel tank 92 and then functions as the hot water flow path 113 that is open again to the connector-receptor 110. The hot cooling water that has flown through the cooling water flow path 115 and has been heated in the heat exchange unit 96 flows through the hot water flow path 113. The hot water flow path connecting element 114, which is included in the connector-receptor 110, is formed as the end structure of the hot water flow path 113. When the connector 70 is fitted in the connector-receptor 110, the hot water flow path connecting element 114 is joined with the hot water flow path connector element 74 discussed previously. This connects the hot water flow path 113 with the hot water flow path 75 and enables the hot water heated with the heat evolved in the course of absorption of hydrogen into the hydrogen storage alloy to be fed to the hydrogen generator supplier 10A.

When hydrogen is produced and stored by the hydrogen generator supplier 10B of the third embodiment constructed as discussed above, the controller 60 executes the same processing as the hydrogen storage regulation routine shown in the flowchart of FIG. 7. Prior to this processing, the procedure of the third embodiment outputs a driving signal to set the valve 27A in the ON position and the valve 28B in the OFF position. This enables a supply of water required for the reforming reactions to be added to the desulfurized gas that flows through the desulfurized gas supply conduit 14. In the case where a sufficient amount of hydrogen is stored in the accumulator 55 and the operation stop routine is carried out at step S120, the procedure outputs a driving signal to set the valve 27A in the OFF position.

Figure 8:
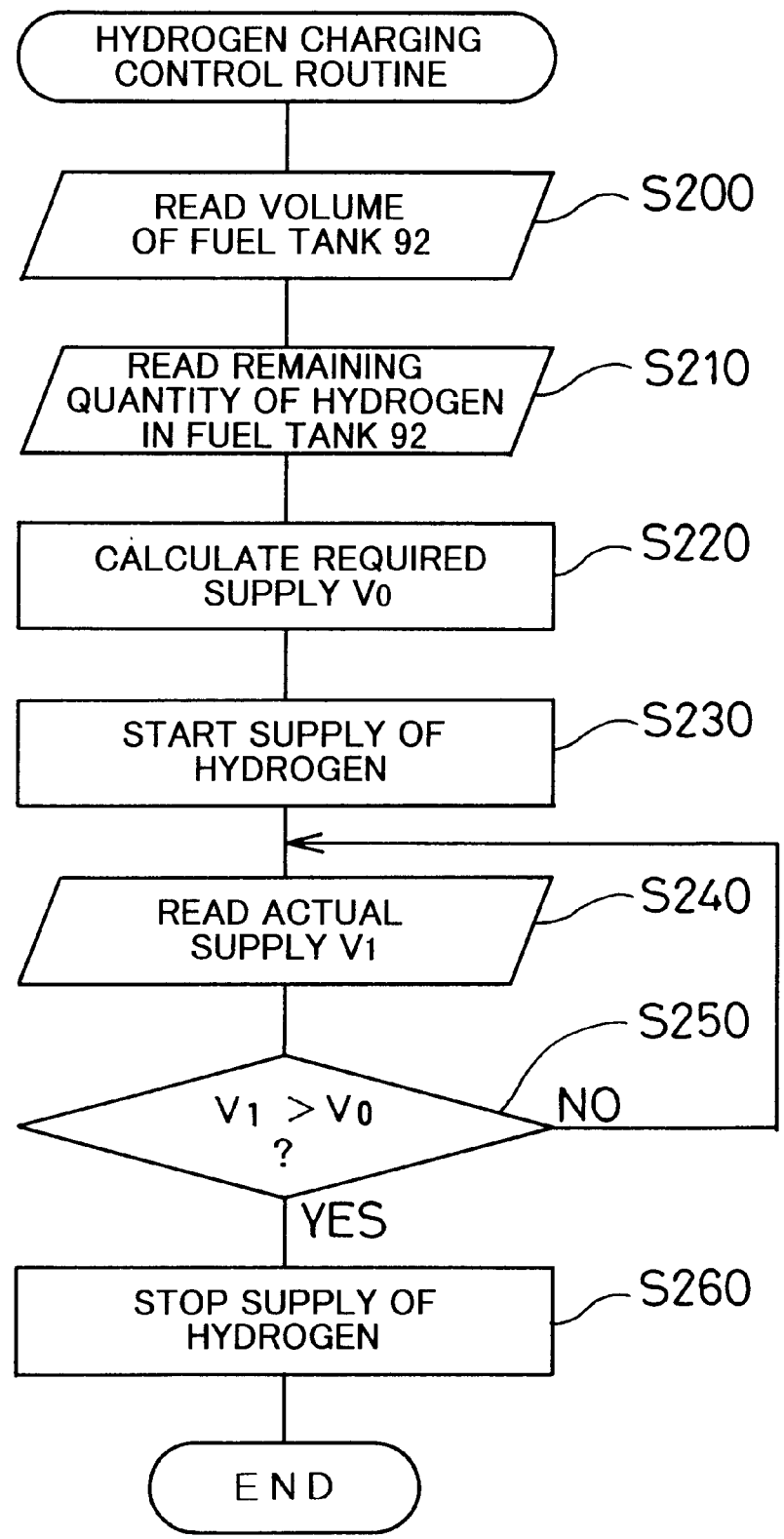
FIG. 8 is a flowchart showing a procedure of regulating the quantity of hydrogen supplied from the hydrogen generator supplier 10 to the electric vehicle 90.

When a supply of hydrogen is fed from the hydrogen generator supplier 10B of the embodiment to the fuel tank 92 of the electric vehicle 90B, the controller 60 executes the same processing as the hydrogen charging control routine shown in the flowchart of FIG. 8. Prior to the output of the driving signal to initiate the supply of hydrogen at step S230, the procedure outputs a driving signal to set the valve 27A in the OFF position and the valve 28A in the ON position. This enables the fuel tank 92, which has been heated with the heat generated in the course of absorption of hydrogen into the hydrogen storage alloy to be cooled down by the cooling water. In the case where a sufficient amount of hydrogen is fed into the fuel tank 92 and the supply of hydrogen is stopped at step S260, the procedure outputs a driving signal to set the valve 28A in the OFF position. It is here preferable that the valve 28A is set in the OFF position after a certain time period has elapsed since the stop of the supply of hydrogen into the fuel tank 92. This arrangement enables the fuel tank 92 to be sufficiently cooled down.

Like the hydrogen generator suppliers and the electric vehicles of the first and the second embodiments, the hydrogen generator supplier 10B and the electric vehicle 90B of the third embodiment enable the automatic production and storage of a sufficient quantity of hydrogen and the automatic supply of a sufficient quantity of hydrogen into the fuel tank of the electric vehicle. The hydrogen generator supplier 10B and the electric vehicle 90B of the third embodiment further exert the following effects. In the third embodiment, the cooling water for cooling down the fuel tank 92 is successively supplied, while the hot water heated by the heat exchange in the fuel tank 92 is released to the outside. This arrangement enables the heat generated in the course of absorption of hydrogen into the hydrogen storage alloy to be utilized. The structure of the third embodiment does not circulate the cooling water inside the electric vehicle 90B, thereby preventing the pump for circulating the cooling water and the other related elements from consuming the electric power in the electric vehicle 90B.

The hot water heated by the heat exchange in the fuel tank 92 may be applicable, for example, to hot water heaters for domestic use. In one example, the hot water supply tube 88 is connected to a certain hot water reservoir included in the hot water heaters for domestic use. The hot water heated by the heat exchange in the fuel tank 92 can thus be stored in the certain hot water reservoir and used in the bathroom and the kitchen of the house. The hot water supply tube 88 may be extended to the bathroom to directly supply hot water to the bathtub. In the case where the titanium alloy or rare earth element alloy is used for the hydrogen storage alloy like this embodiment, the hot water heated by the heat exchange in the fuel tank 92 has the temperatures of approximately 40 to 60° C. The hot water heated by the heat exchange in the fuel tank 92 may be further heated to higher temperatures in the hot water reservoir or the like before being stored, according to the requirements. The use of hot water effectively prevents the waste of the thermal energy generated in the course of absorption of hydrogen and saves the energy consumed in the house.

Like in the second embodiment, in the structure of the third embodiment, the water supply branch path 28 and the hot water flow path 75 are laid in the connection tube 82 included in the hydrogen generator supplier 10B. Supply of the cooling water to the electric vehicle 90B and discharge of hot water from the electric vehicle 90B are implemented simply by joining the connector 70 with the connector-receptor 110. One possible modification lays the water supply branch path 28 and the hot water flow path 75 in a structure other than the connection tube 82. In this case, the supply of the cooling water and the discharge of hot water are not via the joint of the connector 70 with the connector-receptor 110.

Figure 13:
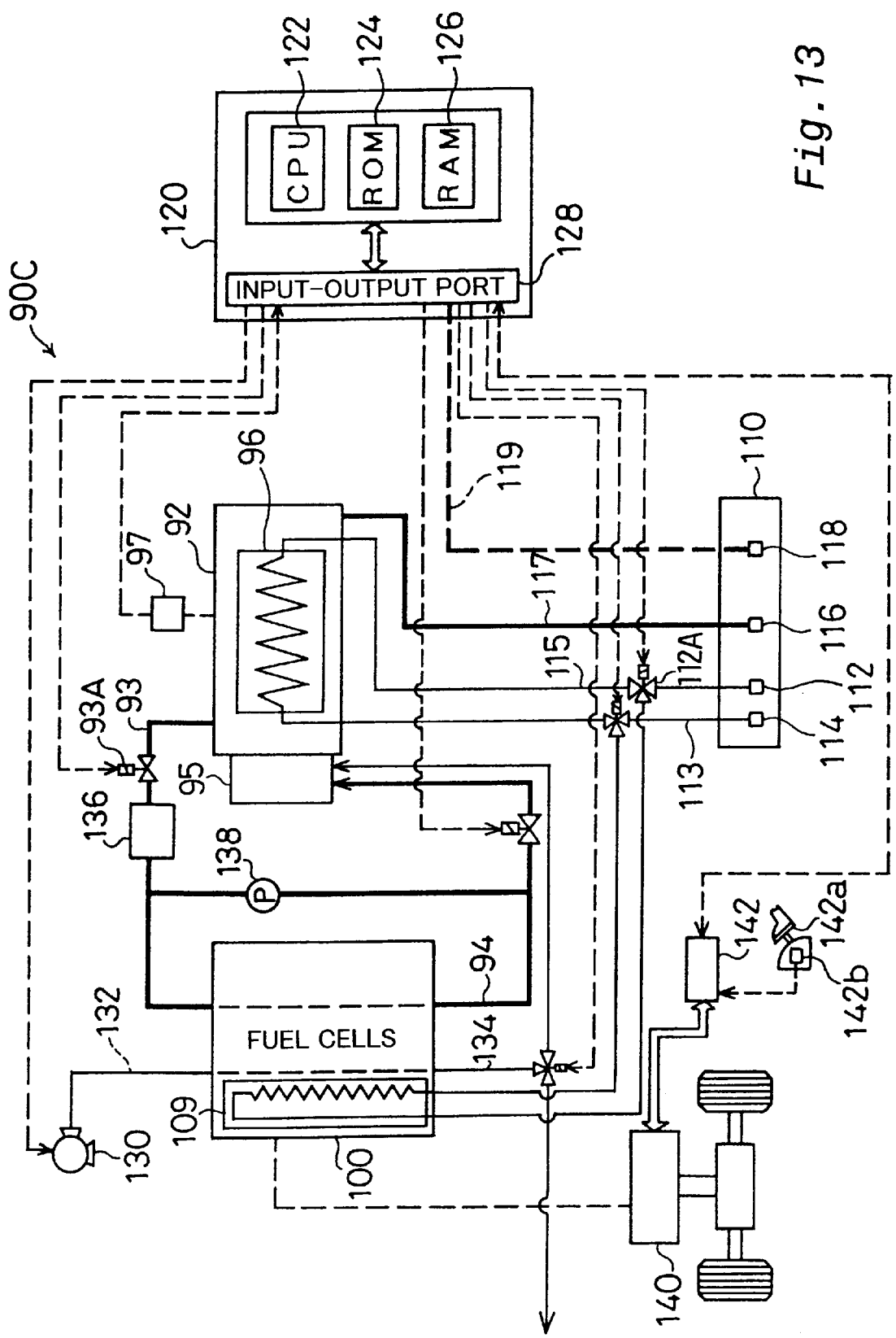
FIG. 13 is a block diagram illustrating the structure of a hydrogen generator supplier 10C in a fourth embodiment according to the present invention.

In one modification of the third embodiment, the heat generated in the fuel cells 100 may be utilized to release hydrogen from the fuel tank 92 like the second embodiment. This modified structure is described below as a fourth embodiment according to the present invention. FIG. 13 is a block diagram illustrating the structure of an electric vehicle 90C in the fourth embodiment. The electric vehicle 90C of the fourth embodiment has a similar structure to that of the electric vehicle 90B of the third embodiment. The difference from the third embodiment is that the hot water flow path 113 and the cooling water flow path 115 branch off at the predetermined positions to be laid in the fuel cells 100 and form the heat exchange unit 109 in the same manner as the electric vehicle 90A of the second embodiment. The hydrogen generator supplier having the same structure as that of the hydrogen generator supplier 10B of the third embodiment is used to feed a supply of hydrogen to the fuel tank 92 included in the electric vehicle 90C of the fourth embodiment.

In the electric vehicle 90C of the fourth embodiment, when a supply of hydrogen is fed from the hydrogen generator supplier 10B, the cooling water flowing through the heat exchange unit 96 goes through the water inlet 26, the water supply path 27, the water supply branch path 28, and the water flow path connector element 72 and is led from the hydrogen generator supplier 10B to the cooling water flow path 115. The cooling water is heated while the fuel tank 92 is cooled down in the heat exchange unit 96. The hot cooling water is introduced via the hot water flow path 113 into the hydrogen generator supplier 10B. The hot cooling water then flows through the hot water flow path 75 via the hot water flow path connector element 74 and is discharged from the end of the hot water supply tube 88 to the outside of the hydrogen generator supplier 10B, so as to be stored, for example, in the hot water heater for domestic use.

When the electric vehicle 90C of the fourth embodiment runs, the controller 120 controls the changeover valves 112A and 114A, so as to connect the flow path constituting the heat exchange unit 96 with the flow path constituting the heat exchange unit 109. In this arrangement, the temperature of the cooling water is increased by cooling the fuel cells 100 down in the heat exchange unit 109. The temperature of the hot cooling water is then decreased by heating the fuel tank 92 in the heat exchange unit 96 and making hydrogen released from the hydrogen storage alloy.

The electric vehicle 90C of the fourth embodiment allows the utilization of heat produced in the fuel tank 92 in the course of the supply of hydrogen like the third embodiment and enables hydrogen to be released from the fuel tank 92 by utilizing the thermal energy generated in the fuel cells 100 like the second embodiment, in addition to the same effects as those of the first embodiment. This desirably improves the energy efficiency of the whole system.

Figure 14:
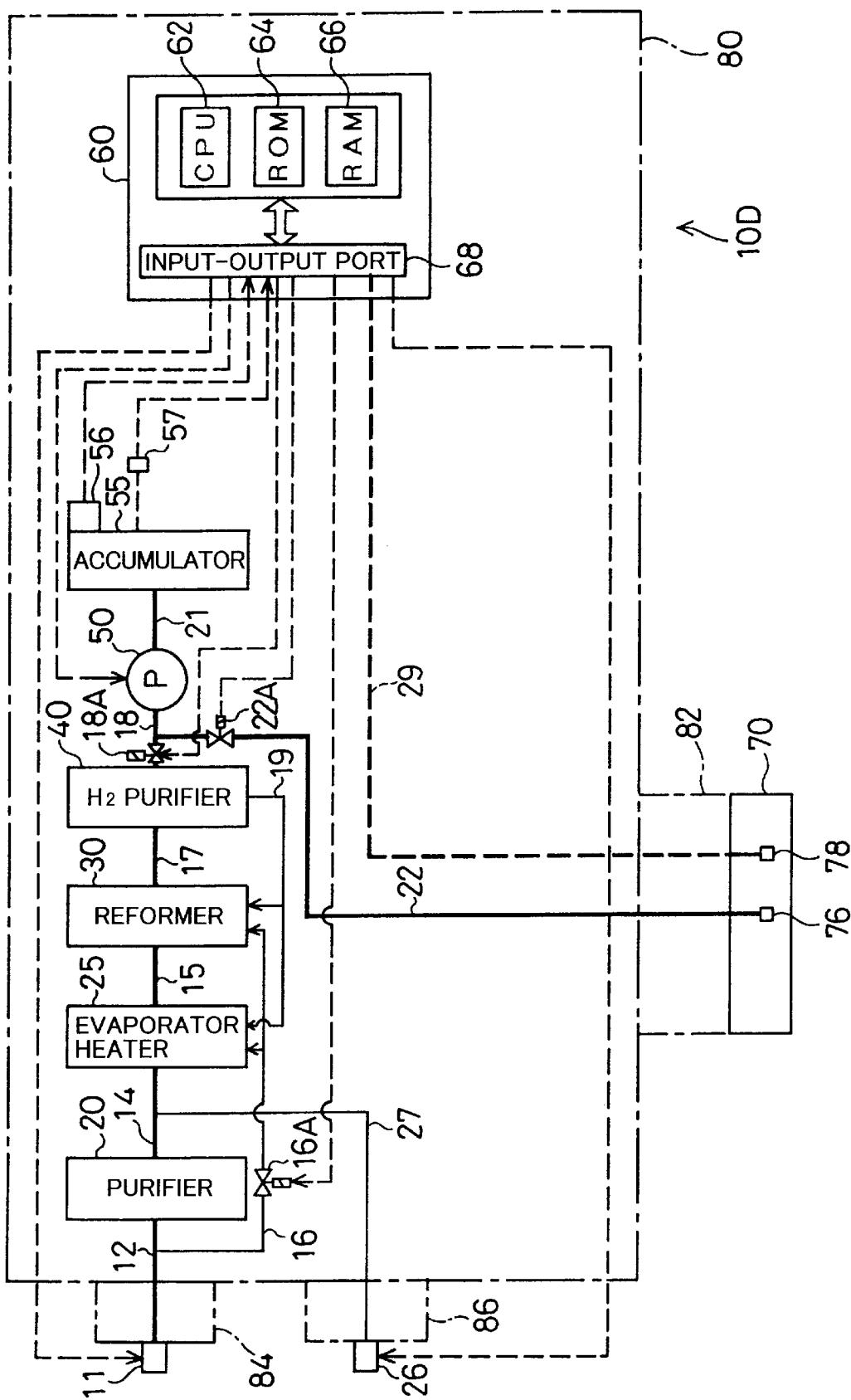
FIG. 14 is a block diagram illustrating the structure of a hydrogen generator supplier 10D in a fifth embodiment according to the present invention.
Figure 15:
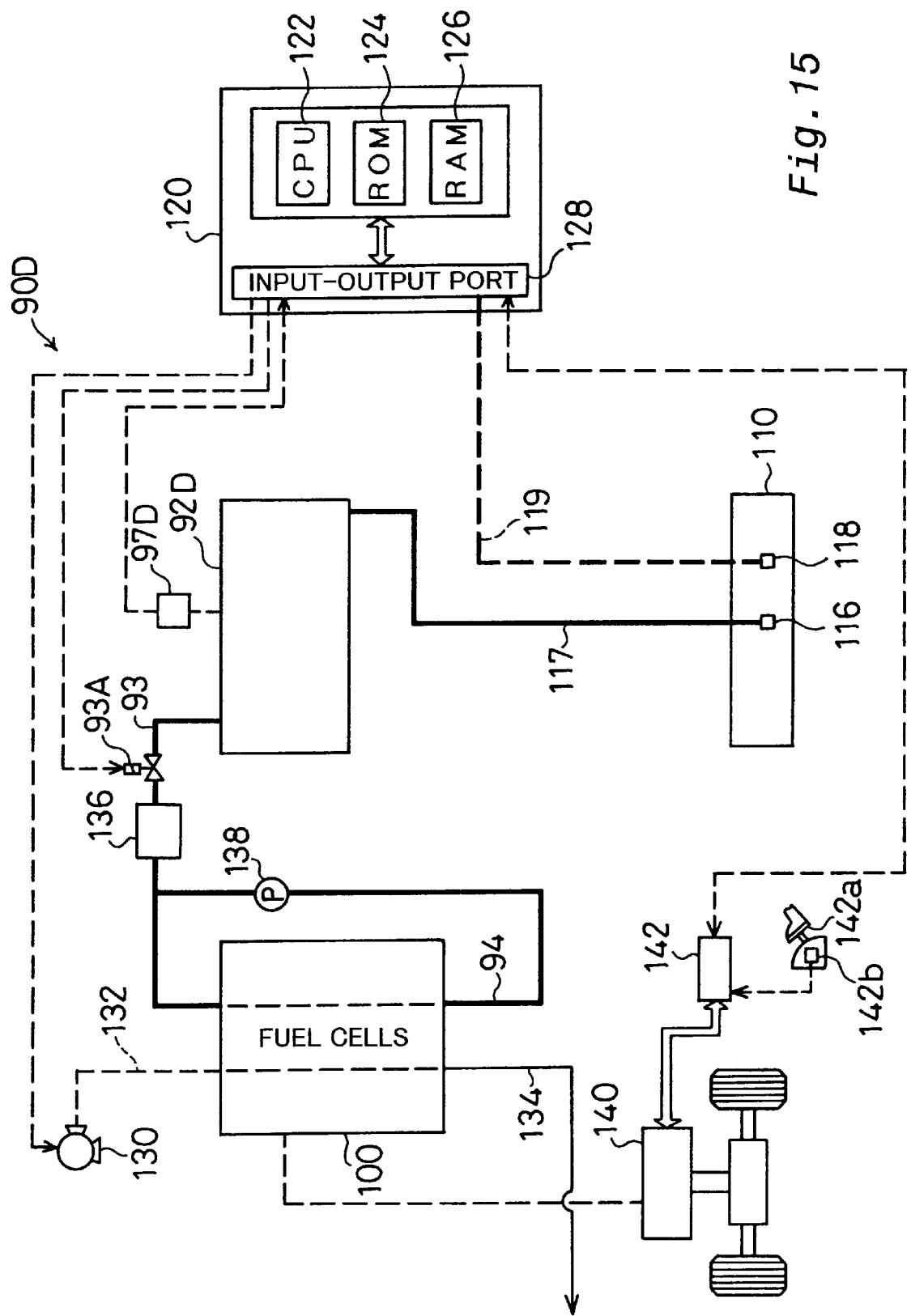
FIG. 15 is a block diagram illustrating the structure of an electric vehicle 90D in the fifth embodiment.

In the first through the fourth embodiments discussed above, the fuel tank of the electric vehicle includes the hydrogen storage alloy, in which hydrogen is absorbed and thereby stored. One possible modification applies a hydrogen tank, in which hydrogen is pressurized and stored in the gaseous form, for the fuel tank. This structure is described below as a fifth embodiment according to the present invention. FIGS. 14 and 15 schematically illustrate the structures of a hydrogen generator supplier 10D and an electric vehicle 90D in the fifth embodiment, respectively. The constituents identical with those of the hydrogen generator supplier 10 and the electric vehicle 90 of the first embodiment are shown by the same numerals and are not specifically described here. Only the configuration different from the first embodiment is discussed below.

In the hydrogen generator supplier 10D of the fifth embodiment, the hydrogen supply path 22 that feeds a supply of hydrogen stored in the accumulator 55 to the electric vehicle 90D connects with the hydrogen supply passageway 18, instead of the accumulator 55. The hydrogen supply passageway 18 has a valve 18 disposed before the joint with the hydrogen supply path 22, while a valve 22A is disposed in the hydrogen supply path 22.

These valves 18A and 22A are connected to the controller 60, which controls the ON/OFF conditions of the valves 18A and 22A. When hydrogen is produced in the hydrogen generator supplier 10D, the valve 18A is set in the ON position and the valve 22A is set in the OFF position, so that hydrogen is stored in the accumulator 55. When a supply of hydrogen is fed from the hydrogen generator supplier 10D to the electric vehicle 90D, on the other hand, the valve 18A is set in the OFF position and the valve 22A is set in the ON position, so that the hydrogen stored in the accumulator 55 is pressurized by the compressor 55 and fed to the electric vehicle 90D.

The electric vehicle 90D of the fifth embodiment has a tank in which hydrogen under pressure is stored in the gaseous form, as a fuel tank 92D as mentioned above. The fuel tank 92D does not produce heat in the course of the supply of hydrogen nor needs heating in the course of the release of hydrogen. Unlike the electric vehicles of the first through the fourth embodiments, the electric vehicle 90D of the fifth embodiment does not have the mechanism for cooling down and heating the fuel tank. The fuel tank 92D has a pressure sensor 97D, in place of the remaining hydrogen quantity monitor 97. The pressure sensor 97D measures the remaining quantity of hydrogen in the fuel tank 92D and inputs the result of measurement to the controller 120.

As described above, in the electric vehicle 90D of the fifth embodiment, the fuel tank 92D does not have the heater unit 95, so that the gaseous fuel exhaust discharged from the fuel cells 100 is all returned to the fuel supply conduit 93 and fed again as the gaseous fuel to the fuel cells 100. The oxidizing gas exhaust discharged from the fuel cells 100 is, on the other hand, introduced into a predetermined discharge unit and eventually discharged to the outside of the electric vehicle 90D.

The hydrogen charging control routine shown in the flowchart of FIG. 8 is executed when a supply of hydrogen is fed from the hydrogen generator supplier 10D constructed as discussed above to the electric vehicle 90D. In this embodiment, the detection value of the pressure sensor 97D, instead of the detection value of the remaining hydrogen quantity monitor 97, is read as the remaining quantity of hydrogen in the fuel tank at step S210. The procedure of step S230 regulates the valve 18A in the OFF position and the valve 22A in the ON position to start the supply of hydrogen.

In the hydrogen generator supplier 10D and the electric vehicle 90D of the fifth embodiment discussed above, hydrogen under pressure is stored in the gaseous form in the fuel tank 92, instead of being absorbed into the hydrogen storage alloy. This arrangement does not require the fuel tank 92D to be cooled down or heated when hydrogen is fed into the fuel tank 92D or hydrogen is taken out of the fuel tank 92D. This favorably simplifies the structure of the electric vehicle 90D. Compared with the structure of absorbing and storing hydrogen in the hydrogen storage alloy, the structure of pressurizing and storing hydrogen in the gaseous form like the fuel tank 92D of the embodiment ensures the quicker operations for the supply of hydrogen. In the case where the hydrogen under pressure is supplied, a supply of hydrogen is fed from the accumulator 55 to the fuel tank 92D while the hydrogen pressure is regulated according to the observed remaining quantity of hydrogen in the fuel tank 92D. This arrangement completes the supply of hydrogen significantly quicker than the structure that absorbs and stores hydrogen through the chemical reaction of hydrogen with the metal.

In the hydrogen generator supplier 10D of the fifth embodiment, the hydrogen supply path 22 connects with the hydrogen supply passageway 18. This arrangement enables the same compressor 50 to be used both at the time of the supply of hydrogen into the accumulator 55 and at the time of the release of hydrogen from the accumulator 55, simply by changing the flow path. This accordingly simplifies the structure. In accordance with one possible modification, the hydrogen generator supplier 10D may have two different compressors, which are respectively used at the time of the supply of hydrogen into the accumulator 55 and at the time of the release of hydrogen from the accumulator 55. In another modification, the compressor used for making hydrogen released from the accumulator 55 may be disposed in the electric vehicle 90D. In this case, after the supply of hydrogen into the electric vehicle 90D, the hydrogen is pressurized by the compressor and fed into the fuel tank 92D.

The hydrogen generator suppliers of the first through the fifth embodiments have the accumulator 55 in which hydrogen under pressure is stored. One possible modification stores hydrogen by making the hydrogen absorbed into the hydrogen storage alloy, instead of by pressuring the hydrogen. The following describes such modification in which this structure is applied to the hydrogen generator supplier 10 of the first embodiment, as a hydrogen generator supplier 10E in a six embodiment according to the present invention.

Figure 16:
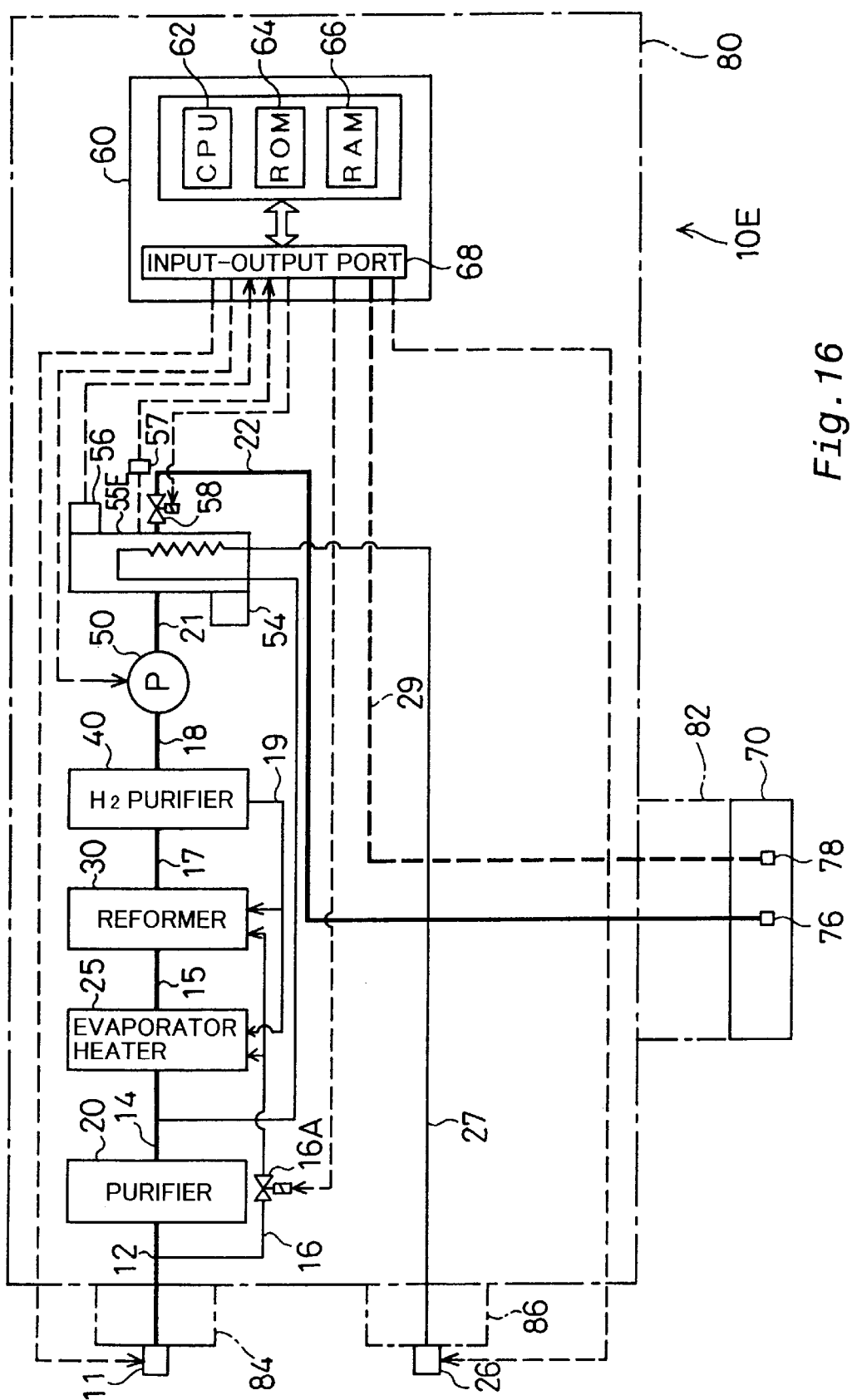
FIG. 16 is a block diagram illustrating the structure of a hydrogen generator supplier 10E in a sixth embodiment according to the present invention.

Referring to FIG. 16, the hydrogen generator supplier 10E has a hydrogen storage unit 55E including a hydrogen storage alloy, in which hydrogen is absorbed and thereby stored, in place of the accumulator 55. Here the hydrogen storage unit 55E has a storage capacity of hydrogen that is not less than the volume of the fuel tank 92 that is included in the electric vehicle 90 and receives a supply of hydrogen fed from the hydrogen generator supplier 10E.

In the hydrogen generator supplier 10E of the embodiment, the water supply path 27, to which water is supplied via the water inlet 26, is laid inside the hydrogen storage unit 55E to form a heat exchange unit before the joint with the desulfurized gas supply conduit 14. In the case where hydrogen is stored into the hydrogen storage unit 55E, the exothermic reaction proceeds accompanied with the absorption of hydrogen into the hydrogen storage alloy. The water flow through the heat exchange unit formed by the water supply path 27 cools the hydrogen storage unit 55E down. The hot water heated in the heat exchange unit flows through the water supply path 27, reaches the desulfurized gas supply conduit 14, and is added to the desulfurized gas as the water required for the reforming reactions.

The hydrogen storage unit 55E has a heater unit 54 for heating the inside of the hydrogen storage unit 55E. When a supply of hydrogen stored in the hydrogen storage unit 55E is fed to the electric vehicle 90, the heater unit 54 heats the hydrogen storage unit 55E to accelerate the release of hydrogen from the hydrogen storage alloy. The heater unit 54 may produce heat by utilizing the electric power fed from a predetermined commercial power source, or alternatively by receiving a supply of the city gas via the gas inlet 11 and combusting the city gas.

In the hydrogen generator supplier 10E of the sixth embodiment constructed as discussed above, hydrogen is absorbed and thereby stored in the hydrogen storage alloy. Compared with the structure that stores hydrogen in the pressurized gaseous form, this arrangement effectively reduces the loss of hydrogen in the case where the hydrogen generator supplier is left over a long time period under the hydrogen storage condition. At the time of production of hydrogen, the structure of the sixth embodiment increases the temperature of water with the heat produced in the course of the absorption of hydrogen into the hydrogen storage alloy and utilizes the hot water for the reforming reactions. This effectively reduces the consumption of energy by the evaporator heater 25 and prevents the heat produced in the course of the absorption of hydrogen from being wasted. The structure of making hydrogen absorbed and thereby stored in the hydrogen storage alloy is applicable not only to the hydrogen generator supplier 10 of the first embodiment, but to the hydrogen generator supplier 10A of the second embodiment and the other structures.

The hydrogen generator suppliers of the first through the sixth embodiments discussed above have the hydrogen storage means, such as the accumulator and the hydrogen storage unit, in order to store a sufficient quantity of hydrogen in advance. One possible modification does not have the hydrogen storage means and causes a supply of hydrogen to the electric vehicle simultaneously with production of hydrogen. This modified structure is discussed below as a seventh embodiment according to the present invention.

Figure 17:
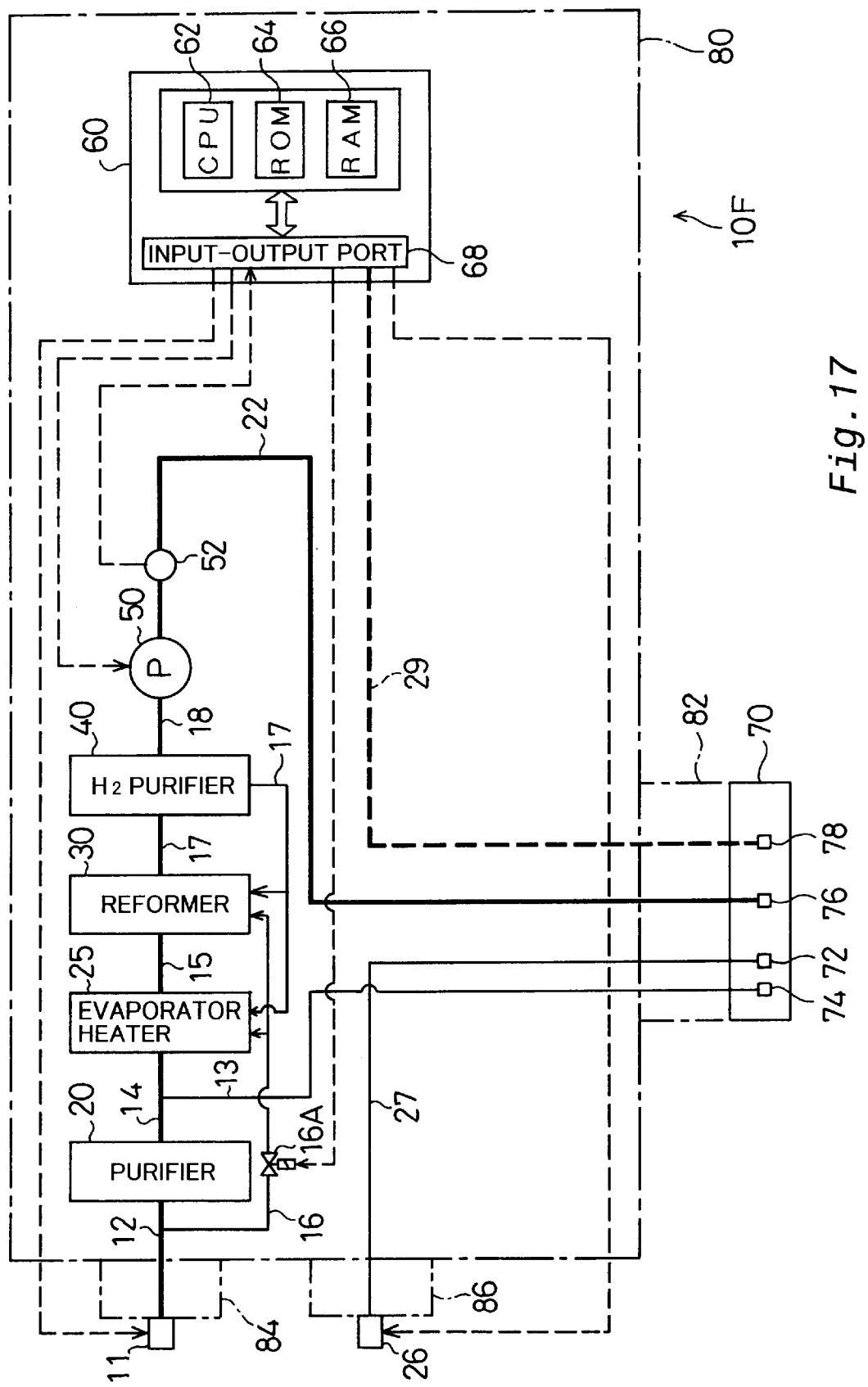
FIG. 17 is a block diagram illustrating the structure of a hydrogen generator supplier 10F in a seventh embodiment according to the present invention.

FIG. 17 schematically illustrates the structure of a hydrogen generator supplier 10F in the seventh embodiment. The constituents of the hydrogen generator supplier 10F identical with those of the hydrogen generator supplier 10 of the first embodiment are shown by the same numerals and are not specifically described here. Only the configuration different from the first embodiment is discussed below. The electric vehicle that receives a supply of hydrogen fed from the hydrogen generator supplier 10F of the seventh embodiment has the same structure as that of the electric vehicle 90A of the second embodiment.

In the hydrogen generator supplier 10F, the compressor 50 is connected to the hydrogen supply path 22, and the hydrogen pressurized by the compressor 50 is not stored but is directly fed to the electric vehicle 90A via the connector 70. A gas flow sensor 52 is disposed in the hydrogen supply path 22. The gas flow sensor 52 is connected to the controller 60 and inputs information relating to the flow of hydrogen fed to the electric vehicle 90A into the controller 60. Although a Doppler sensor is used for the gas flow sensor in this embodiment, a different sensor may be used instead.

The water supply path 27, to which water is supplied via the water inlet 26, is not connected to the desulfurized gas supply conduit 14, but is laid in the connection tube 82 to reach the connector 70 and is open at the water flow path connector element 72 included in the connector 70. A hot water supply conduit 13, in place of the water supply path 27, is connected to the desulfurized gas supply conduit 14 included in the hydrogen generator supplier 10F. The hot water supply conduit 13 is laid in the connection tube 82 and has one end that is open to the hot water flow path connector element 74 included in the connector 70.

In this embodiment, water supplied via the water inlet 26 into the hydrogen generator supplier 10F is fed into the electric vehicle 90A via the connector 70, flows through the cooling water flow path 115, and cools down the fuel tank 92 including the hydrogen storage alloy. The hot water that has been subjected to the heat exchange in the heat exchange unit 96 formed by the cooling water flow path 115 and thereby heated is fed into the hydrogen generator supplier 10F via the hot water flow path 113, the hot water flow path connecting element 114, and the hot water flow path connector element 74. In the hydrogen generator supplier 10F, the hot water is flown through the hot water supply conduit 13 and added to the desulfurized gas as the water required for the reforming reactions.

Figure 18:
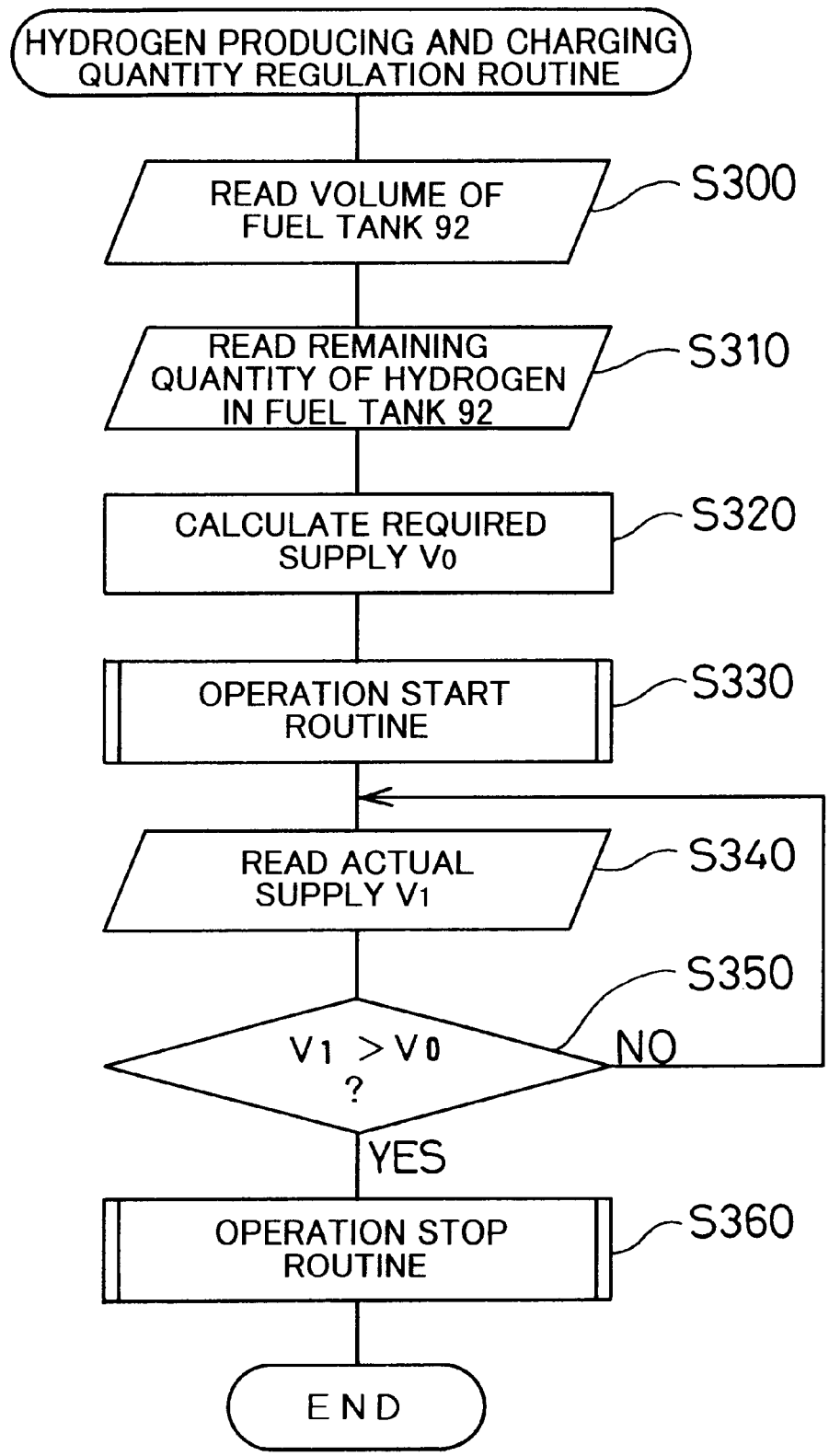
FIG. 18 is a flowchart showing a procedure of regulating the quantity of hydrogen generated by the hydrogen generator supplier 10F and the quantity of hydrogen supplied from the hydrogen generator supplier 10F to the electric vehicle 90A.

The following describes the operation carried out when the hydrogen generator supplier 10F of the seventh embodiment constructed as discussed above feeds a supply of hydrogen to the electric vehicle 90A. When the connector 70 of the hydrogen generator supplier 10F is joined with the connector-receptor 110 of the electric vehicle 90A and a predetermined start switch mounted on the hydrogen generator supplier 10F is turned ON, the controller 60 executes a hydrogen producing and charging quantity regulation routine shown in the flowchart of FIG. 18 at predetermined time intervals, in order to feed a specific quantity of hydrogen into the fuel tank 92 of the electric vehicle 90A. The following description regards the operation of the hydrogen generator supplier 10F of the embodiment that feeds a supply of hydrogen to the electric vehicle 90A while producing hydrogen, according to the flowchart of FIG. 18.

When the program enters the routine, the CPU 62 first reads the volume of the fuel tank 92 (step S300). This process is carried out especially for the electric vehicle having fuel tanks of different volumes. The information relating to the volume of the fuel tank 92 is stored in advance in the controller 120 of the electric vehicle 90A. The CPU 62 subsequently reads the remaining quantity of hydrogen in the fuel tank 92 (step S310). The remaining quantity of hydrogen in the fuel tank 92 is stored in the controller 120 of the electric vehicle 90A as a value calculated from the consumption of hydrogen integrated by the remaining hydrogen quantity monitor 97. The values representing the volume of the fuel tank 92 and the remaining quantity of hydrogen in the fuel tank 92 are transmitted from the electric vehicle 90A to the controller 60 of the hydrogen generator supplier 10F via the signal lines 29 and 119 connecting with each other in the connector 70 and the connector-receptor 110.

The CPU 62 then calculates a required supply V0 to be fed from the hydrogen generator supplier 10F to the electric vehicle 90A, based on the input values representing the volume of the fuel tank 92 and the remaining quantity of hydrogen in the fuel tank 92 (step S320). After calculating the required supply V0, the CPU 62 executes an operation start routine (step S330). The operation start routine is a sub-routine to start the production of hydrogen and the supply of hydrogen to the electric vehicle 90A. A concrete procedure of the operation start routine outputs driving signals to the solenoid valves attached to the gas inlet 11 and the water inlet 26, in order to initiate the supplies of the gas and water to the hydrogen generator supplier 10F. The procedure also outputs a driving signal to the compressor 50, so as to regulate the pressure of hydrogen fed to the fuel tank 92 of the electric vehicle 90A.

When the operation start routine is carried out to start the production of hydrogen and the supply of hydrogen to the electric vehicle 90A, the CPU 62 reads an actual supply V1 of hydrogen fed to the fuel tank 92 (step S340). The actual supply V1 of hydrogen is calculated from the information input from gas flow sensor 52 disposed in the hydrogen supply path 22. The actual supply V1 of hydrogen is subsequently compared with the required supply V0 calculated at step S320 (step S350).

In the case where the required supply V0 is greater than the actual supply V1, it is determined that the quantity of hydrogen fed to the fuel tank 92 is still insufficient. The program then returns to step S340 and reads the actual supply V1 of hydrogen fed to the fuel tank 92 again. Until a sufficient quantity of hydrogen is fed to the fuel tank 92, the program repeats the procedure of reading the actual supply V1 of hydrogen and comparing the actual supply V1 with the required supply V0.

In the case where the actual supply V1 of hydrogen exceeds the required supply V0 at step S350, on the other hand, the program executes an operation stop routine (step S360), before exiting from this routine. The operation stop routine is a sub-routine to stop the production of hydrogen and the supply of hydrogen to the electric vehicle 90A. A concrete procedure of the operation stop routine outputs driving signals to the solenoid valves attached to the gas inlet 11 and the water inlet 26, in order to stop the supplies of the gas and water to the hydrogen generator supplier 10F. The procedure also outputs a stop signal to the compressor 50, so as to stop the supply of hydrogen to the fuel tank 92 of the electric vehicle 90A.

In this embodiment, the information relating to the volume of the fuel tank 92 is stored in the controller 120 and input from the electric vehicle 90A to the hydrogen generator supplier 10F via the signal line 119. In accordance with one possible modification, the user may manually input the volume of the fuel tank 92, which is included in the electric vehicle 90 and receives a supply of hydrogen, to the hydrogen generator supplier 10.

The hydrogen generator supplier 10F and the electric vehicle 90A of the seventh embodiment constructed as discussed above can produce hydrogen from the city gas fed as the commercial gas to each house. Like the first through the sixth embodiments discussed above, the structure of the seventh embodiment enables hydrogen to be widely applied for the fuel of electric vehicles without founding any new distribution system for distributing hydrogen. The hydrogen generator supplier 10F carries out the supply of hydrogen to the electric vehicle 90A simultaneously with the production of hydrogen. The hydrogen generator supplier 10F installed at a preset position is connected to the electric vehicle 90A, in order to feed a supply of hydrogen to the electric vehicle 90A. The production of hydrogen in the hydrogen generator supplier 10F is accordingly free from the influence of the electric vehicle 90A, for example, the driving conditions of the electric vehicle 90A. The reforming reactions can thus be performed under the optimal conditions to produce hydrogen in the reformer 30, thereby attaining the favorably high energy efficiency. When it is desired to complete the supply of hydrogen to the electric vehicle 90A in a shorter time period, the driving conditions for the reforming reactions may be modified from the optimum conditions.

In the process of the supply of hydrogen from the hydrogen generator supplier 10F of the embodiment to the electric vehicle 90A, in the case where a sufficient quantity of hydrogen is fed into the fuel tank 92 of the electric vehicle 90A, the arrangement of the seventh embodiment ceases the operations for producing and supplying hydrogen. This ensures the automatic production of hydrogen by the hydrogen generator supplier 10F and the automatic supply of hydrogen from the hydrogen generator supplier 10F to the fuel tank 92. The user starts the operation of the hydrogen generator supplier 10F after driving home. The electric vehicle 90A with the required amount of hydrogen is then prepared for a next drive (on next morning, for example).

The hydrogen generator supplier 10F and the electric vehicle 90A of this embodiment respectively have the connector 70 and the connector-receptor 110. Joining the connector 70 with the connector-receptor 110 effects the simultaneous and quick connections of the hydrogen supply path 22 with the hydrogen supply conduit 117, of the signal line 29 with the signal line 119, of the water supply path 27 with the cooling water flow path 115, and of the hot water supply conduit 13 with the hot water flow path 113. The connection of the water supply path 27 with the cooling water flow path 115 and the connection of the hot water supply conduit 13 with the hot water flow path 113 may not be via the joint of the connector 70 with the connector-receptor 110.

Like the hydrogen generator suppliers of the first through the sixth embodiments discussed above, the hydrogen generator supplier 10F of this embodiment is portable and is movable to an arbitrary position where the gas inlet 11 and the water inlet 26 are connectable with the piping of the city gas and the water piping for production of hydrogen. The hydrogen generator supplier 10F does not have the accumulator, which further reduces the size of the whole hydrogen generator supplier and facilitates the carriage of the hydrogen generator supplier. Instead of the moving the hydrogen generator supplier 10F to the arbitrary position, the hydrogen generator supplier 10F may be installed at a fixed position in the house and the gas inlet 11 and the water inlet 26 are respectively fixed to predetermined joints of the city gas piping and the water piping.

The hydrogen generator supplier 10F and the electric vehicle 90A of this embodiment carry out the production of hydrogen simultaneously with the supply of hydrogen. The structure of this embodiment utilizes the heat, which is produced in the course of the absorption of hydrogen into the hydrogen storage alloy included in the fuel tank 92, for increasing the temperature of water required for the reforming reactions. This arrangement reduces the energy consumed by the evaporator heater 25 and thereby improves the energy efficiency of the whole system. The hot water heated with the heat produced in the course of the absorption of hydrogen into the hydrogen storage alloy may be used for other applications, such as hot water heaters for domestic use as discussed in the third embodiment, in addition to for the reforming reactions proceeding in the hydrogen generator supplier 10F. Another possible modification cools down the fuel tank 92 by circulating the cooling water and causes the heat evolved by the heat exchange to be released from a predetermined heat radiation unit to the outside, in the same manner as the first embodiment.

In the electric vehicle 90A of this embodiment, hydrogen may be stored in the form of pressurized gas in a hydrogen tank used as the fuel tank 92, instead of being absorbed into the hydrogen storage alloy. In this modified application, the electric vehicle has the same structure as that of the electric vehicle 90D of the fifth embodiment, and the water supply path 27 is directly connected to the desulfurized gas supply conduit 14 in the hydrogen generator supplier 10F.

Figure 19:
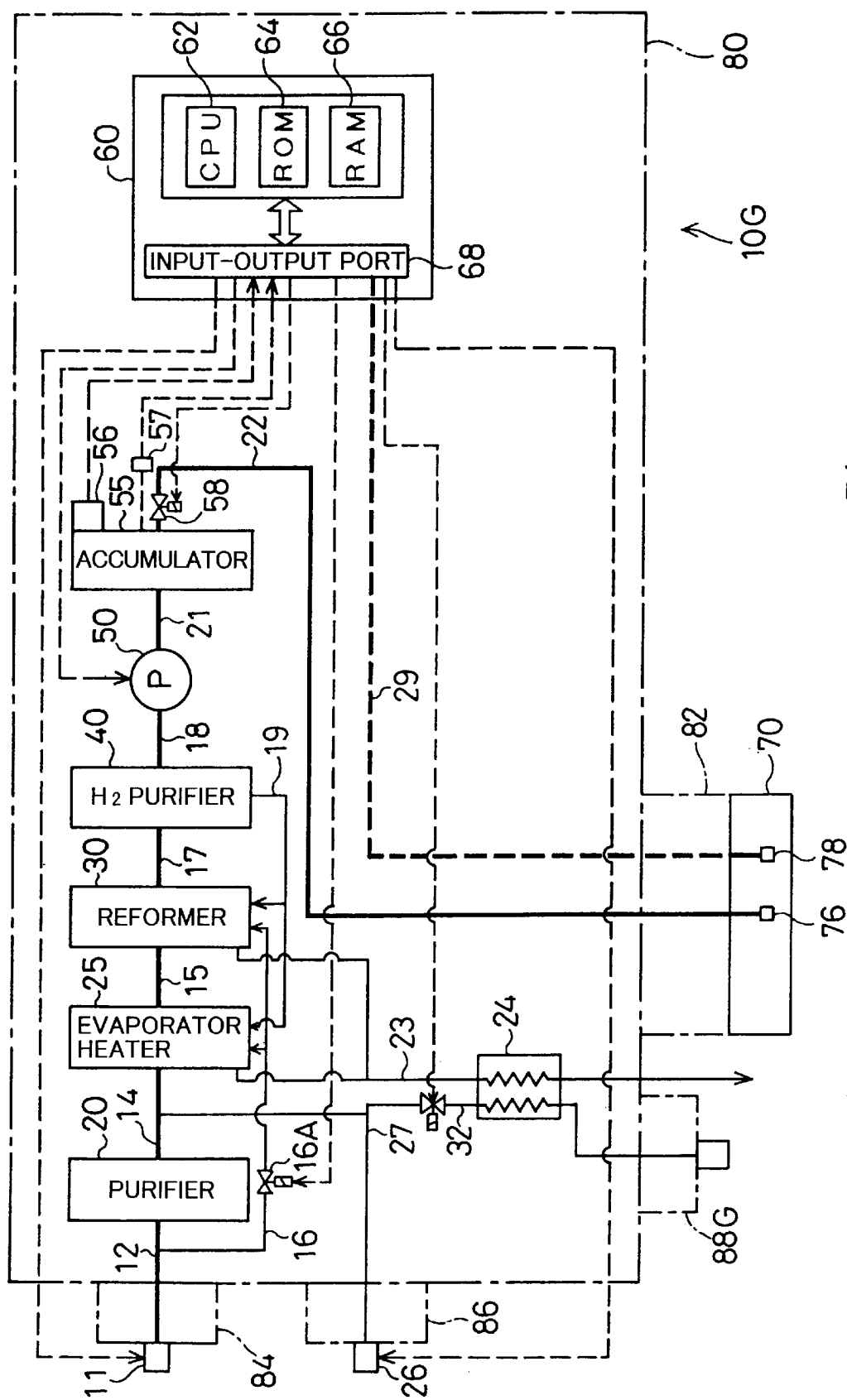
FIG. 19 is a block diagram illustrating the structure of a hydrogen generator supplier 10G in an eighth embodiment according to the present invention.

In the hydrogen generator suppliers of the first through the seventh embodiments discussed above, the predetermined combustion unit provided for heating the evaporator heater 25 (and the reformer 30 when necessary) utilizes the city gas fed through the city gas branch path 16 and the reforming gas exhaust discharged from the hydrogen purifier 40 as the fuel for combustion. Another preferable application does not waste but utilizes the gaseous combustion exhaust discharged from the predetermined combustion unit. This application is described below as an eighth embodiment according to the present invention. FIG. 19 schematically illustrates the structure of a hydrogen generator supplier 10G in the eighth embodiment. The hydrogen generator supplier 10G of the eighth embodiment has a similar structure to that of the hydrogen generator supplier 10 of the first embodiment. The constituents identical with those of the first embodiment are shown by the same numerals and are not specifically described here. Only the structure relating to the flow path of gaseous combustion exhaust, which is characteristic of this embodiment, is discussed below.

The hydrogen generator supplier 10G of the eighth embodiment has a combustion exhaust discharge path 23, to which the gaseous combustion exhaust is discharged from the predetermined combustion unit that is provided for heating the evaporator heater 25 (and the reformer 30 when necessary). The evaporator heater 25 is heated to the temperatures of 600 to 800° C. by the combustion unit. The temperature of the gaseous combustion exhaust discharged to the combustion exhaust discharge path 23 reaches about 100 to 200° C. The gaseous combustion exhaust discharged to the combustion exhaust discharge path 23 is cooled down by the heat exchange unit 24 and released to the outside of the hydrogen generator supplier 10G. A water supply branch path 32 branching off the water supply path 27 is laid in the heat exchange unit 24. The water fed into the water supply branch path 32 is subjected to the heat exchange with the gaseous combustion exhaust and thereby heated. The water supply branch path 32 goes through the heat exchange unit 24 and is then laid in a hot water supply tube 88G, which has the same structure as that of the hot water supply tube 88 included in the hydrogen generator supplier 10B of the third embodiment.

In the hydrogen generator supplier 10G of the eighth embodiment constructed as discussed above, the hot water supply tube 88G mounted on the hydrogen generator supplier 10G is joined with a hot water heater for domestic use or a bathtub. The hot water heated in the heat exchange unit 24 is then used in the bathroom and the kitchen of the house. This structure reduces the quantity of energy wasted in the hydrogen generator supplier 10G and further improves the energy efficiency.

The hydrogen generator supplier 10G of the eighth embodiment has the structure for utilizing the gaseous combustion exhaust discharged from the predetermined combustion unit attached to the evaporator heater 25, in addition to the structure of the hydrogen generator supplier 10 of the first embodiment. This structure of utilizing the gaseous combustion exhaust may, however, be applicable to other hydrogen generator suppliers, for example, those of the second through the seventh embodiments.

In the hydrogen generator supplier 10G of the eighth embodiment, the hot water heated with the thermal energy of the gaseous combustion exhaust discharged to the combustion exhaust discharge path 23 is taken out of the hydrogen generator supplier 10G and used as hot water for the domestic use. In accordance with another possible application, the hot water heated by the gaseous combustion exhaust may be supplied again to the evaporator heater 25 to be mixed with the desulfurized gas and used for the reforming reactions. This modified structure reduces the quantity of energy wasted in the hydrogen generator supplier 10G and decreases the quantity of energy newly consumed by the evaporator heater 25, thereby further improving the energy efficiency in the hydrogen generator supplier 10G.

The hydrogen generator supplier and the electric vehicle of the present invention discussed above enable hydrogen of a high purity to be utilized for the gaseous fuel supplied to the fuel cells mounted on the electric vehicle. This ensures the high efficiency of the electrochemical reactions proceeding in the fuel cells. This arrangement accordingly enables the fuel cells mounted on the electric vehicle to be reduced in size. The electric vehicle of the present invention includes hydrogen of a high purity as the gaseous fuel and does not carry out the reforming reactions inside the electric vehicle. This effectively prevents emission of the exhaust gas containing toxic substances during a run of the vehicle.

The hydrogen generator supplier and the electric vehicle of the present invention utilize the natural gas supplied as the natural resource to produce hydrogen, and carry out the power generation with the fuel cells having the extremely high energy efficiency using the hydrogen as the gaseous fuel, in order to supply the electric power required for the electric vehicle. Compared with the structure that carries out power generation with a generator of a certain energy efficiency using the natural resource and charges the electric vehicle with the supply of the electric power thus obtained, the structure of the present invention ensures the extremely high energy efficiency of the natural resource.

In the above embodiments, the hydrogen generator supplier is installed in each house, and the user of the electric vehicle individually feeds a supply of hydrogen to the electric vehicle. In accordance with another possible application, the hydrogen generator supplier of the present invention is installed in hydrogen stations at predetermined locations. This enables a supply of hydrogen to be fed to the electric vehicle with the shortage of hydrogen, that is, the fuel, during a run. In this case, hydrogen of a high purity is readily obtained by utilizing the city gas for production of hydrogen.

In the above embodiments, the city gas (the natural gas) including methane as a primary component is used as the crude fuel for the reforming reactions. Another crude fuel (for example, butane) may be used instead, as long as the crude fuel is supplied as the commercial gas and readily available. The use of the commercial gas fed through the piping makes the crude fuel easily available and enables the user to use the hydrogen generator supplier in the house. In the case where another crude fuel is selected as the gaseous fuel for producing hydrogen, the gas inlet 11 should have the configuration that is connectable with the piping of the selected crude fuel gas, and the reformer 30 should include the catalyst suitable for the reforming reactions of the selected crude fuel gas. In the case where the gas used as the crude fuel does not contain any odorant, the purifier 20 can be omitted. In the case where the gas used as the crude fuel contains any component that inhibits the subsequent reactions including the electrochemical reactions, it is desirable to incorporate a device for removing the inhibitory component in the hydrogen generator supplier.

The present invention is not restricted to the above embodiments or their modifications, but there may be many other modifications, changes, and alterations without departing from the scope or spirit of the main characteristics of the present invention.

INDUSTRIAL APPLICATIONS

As discussed above, the hydrogen generator supplier, the connector, the electric vehicle, and the method of producing and supplying hydrogen according to the present invention are applicable in the fields of manufacture and sale of electric vehicles.

What is claimed is:

1. A hydrogen generator supplier that feeds a supply of hydrogen to an electric vehicle, said electric vehicle having a fuel storage unit, which comprises a hydrogen storage alloy that enables absorption and storage of hydrogen, and fuel cells, which use the stored gaseous hydrogen as a gaseous fuel, mounted thereon, said hydrogen generator supplier comprising:

a reformer that reforms a crude fuel to produce a hydrogen rich gas;

a hydrogen purifier that separates gaseous hydrogen from the hydrogen rich gas produced by said reformer; and a hydrogen supply unit that feeds the gaseous hydrogen separated by said hydrogen purifier to said fuel storage unit to be stored in the hydrogen storage alloy.

2. A hydrogen generator supplier in accordance with claim 1, said hydrogen generator supplier further comprising:

a fluid discharge unit that takes a fluid, which is heated with heat evolved in said fuel storage unit in the course of absorption of hydrogen into the hydrogen storage alloy, out of said electric vehicle when the gaseous hydrogen is fed to said fuel storage unit by said hydrogen supply unit.

3. A hydrogen generator supplier in accordance with claim 2, wherein said reformer utilizes heat obtained from the fluid taken out by said fluid discharge unit for a reforming reaction of the crude fuel.

4. A hydrogen generator supplier in accordance with any one of claims 1 through 3, wherein a commercial gas comprising a hydrocarbon as a primary component is used for the crude fuel, said hydrogen generator supplier further comprising:

a joint unit that connects with a piping of the commercial gas to enable a feed of the crude fuel.

5. A hydrogen generator supplier that feeds a supply of hydrogen to an electric vehicle, said electric vehicle having a fuel storage unit, which enables storage of gaseous hydrogen, and fuel cells, which use the stored gaseous hydrogen as a gaseous fuel, mounted thereon, said hydrogen generator supplier comprising:

a reformer that reforms a crude fuel to produce a hydrogen rich gas;

a hydrogen purifier that separates gaseous hydrogen from the hydrogen rich gas produced by said reformer;

a hydrogen storage unit that stores the gaseous hydrogen separated by said hydrogen purifier;

a hydrogen supply unit that feeds the gaseous hydrogen stored in said hydrogen storage unit to said fuel storage unit;

a hydrogen load detection unit that measures a quantity of the gaseous hydrogen stored in said hydrogen storage unit; and a hydrogen load regulation unit that controls operations of said reformer and said hydrogen purifier based on the quantity of hydrogen observed by said hydrogen load detection unit and regulates the quantity of hydrogen stored in said hydrogen storage unit to a predetermined level.

6. A hydrogen generator supplier that feeds a supply of hydrogen to an electric vehicle, said electric vehicle having a fuel storage unit, which enables storage of gaseous hydrogen, and fuel cells, which use the stored gaseous hydrogen as a gaseous fuel, mounted thereon, said hydrogen generator supplier comprising:

a reformer that reforms a crude fuel to produce a hydrogen rich gas;

a hydrogen purifier that separates gaseous hydrogen from the hydrogen rich gas produced by said reformer:

a hydrogen supply unit that feeds the gaseous hydrogen separated by said hydrogen purifier to said fuel storage unit;

an input unit that inputs information relating to a remaining quantity of hydrogen in said fuel storage unit mounted on said electric vehicle; and a hydrogen supply regulation unit that controls operations of said reformer and said hydrogen purifier based on the information relating to the remaining quantity of hydrogen input by said input unit, in order to produce a predetermined quantity of hydrogen, and supplies the predetermined quantity of hydrogen to said fuel storage unit via said hydrogen supply unit.

7. A connector that connects a hydrogen supplier for feeding a supply of hydrogen with an electric vehicle, said electric vehicle having a fuel storage unit, which stores gaseous hydrogen, and fuel cells, which use the stored gaseous hydrogen as a gaseous fuel, mounted thereon, said connector comprising:

a first connection unit that connects said electric vehicle with said hydrogen supplier via a hydrogen supply path, through which hydrogen is fed from said hydrogen supplier to said fuel storage unit; and a second connection unit that connects said electric vehicle with said hydrogen supplier via a signal line, which transmits information relating to a remaining quantity of hydrogen in said fuel storage unit to said hydrogen supplier.

8. An electric vehicle with fuel cells, which use hydrogen as a gaseous fuel, mounted thereon, wherein electric power obtained from said fuel cells is utilized for a driving force of said electric vehicle, said electric vehicle comprising:

a fuel storage unit that comprises a hydrogen storage alloy, in which hydrogen is absorbed and thereby stored as the gaseous fuel;

a fluid heating unit that heats a predetermined fluid with heat evolved in said fuel storage unit in the course of absorption of hydrogen into the hydrogen storage alloy when a supply of hydrogen is fed to said fuel storage unit; and a heat release unit that leads the fluid heated by said fluid heating unit to outside of said electric vehicle.

9. An electric vehicle with fuel cells, which use hydrogen as a gaseous fuel, mounted thereon, wherein electric power obtained from said fuel cells is utilized for a driving force of said electric vehicle, said electric vehicle comprising:

a fuel storage unit that stores hydrogen as the gaseous fuel;

a remaining hydrogen quantity detection unit that measures a remaining quantity of hydrogen in said fuel storage unit; and a remaining hydrogen quantity transmission unit that transmits information relating to the remaining quantity of hydrogen observed by said remaining hydrogen quantity detection unit to a preset hydrogen supplier, which feeds a supply of hydrogen to said fuel storage unit.

10. An electric vehicle system comprising an electric vehicle and a hydrogen generator supplier, said electric vehicle having fuel cells, which use hydrogen as a gaseous fuel, mounted thereon and utilizing electric power obtained from said fuel cells for a driving force of said electric vehicle, said hydrogen generator supplier reforming a crude fuel to produce gaseous hydrogen and feeding the gaseous hydrogen as the gaseous fuel to said electric vehicle, wherein said electric vehicle comprises:

a fuel storage unit that comprises a hydrogen storage alloy, in which hydrogen is absorbed and thereby stored as the gaseous fuel; and a heat discharge unit that discharges heat, which is evolved in said fuel storage unit in the course of absorption of hydrogen into the hydrogen storage alloy when a supply of hydrogen is fed to said fuel storage unit, to outside of said electric vehicle via a specific fluid, and wherein said hydrogen generator supplier comprises:

a reformer that reforms the crude fuel by taking advantage of the heat discharged via the specific fluid by said heat discharge unit of said electric vehicle when a supply of hydrogen is fed from said hydrogen generator supplier to said electric vehicle.

11. A hydrogen generator supplier that feeds a supply of hydrogen to an electric vehicle, said electric vehicle having a fuel storage unit, which enables storage of gaseous hydrogen, and fuel cells, which use the stored gaseous hydrogen as a gaseous fuel, mounted thereon, said hydrogen generator supplier comprising:

a reformer that reforms a crude fuel to produce a hydrogen rich gas;

a hydrogen purifier that separates gaseous hydrogen from the hydrogen rich gas produced by said reformer; and a hydrogen supply unit that feeds the gaseous hydrogen separated by said hydrogen purifier to said fuel storage unit, wherein said hydrogen generator supplier is constructed as a separate body from said electric vehicle.

12. A hydrogen generator supplier in accordance with claim 11, said hydrogen generator supplier further comprising:

a crude fuel supply unit that feeds a supply of the crude fuel into said hydrogen generator supplier; and a water supply unit that feeds a supply of water, which is required for reforming the crude fuel and producing the hydrogen rich gas, into said hydrogen generator supplier, wherein said hydrogen supply unit comprises a first joint unit that enables free attachment to and detachment from said electric vehicle, said crude fuel supply unit comprises a second joint unit that enables free attachment to and detachment from a crude fuel supplier, which feeds the supply of the crude fuel to said hydrogen generator supplier, and said water supply unit comprises a third joint unit that enables free attachment to and detachment from a water supplier, which feeds the supply of water to said hydrogen generator supplier.

13. A hydrogen generator supplier in accordance with claim 12, wherein the separate body including said reformer and said hydrogen purifier has a grip unit on an outer surface thereof, in order to facilitate carriage of said hydrogen generator supplier.

* * * * *